(12) United States Patent
Hori et al.

(10) Patent No.: US 12,059,741 B2
(45) Date of Patent: Aug. 13, 2024

(54) METHOD FOR MANUFACTURING LIQUID-COOLING JACKET USING A ROTARY TOOL WITH A PIN STEP PORTION ON A BASE SIDE PIN AND A SPIRAL GROOVE ON A TIP SIDE PIN

(71) Applicant: NIPPON LIGHT METAL COMPANY, LTD., Tokyo (JP)

(72) Inventors: Hisashi Hori, Shizuoka (JP); Nobushiro Seo, Shizuoka (JP); Kosuke Yamanaka, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 499 days.

(21) Appl. No.: 16/959,087

(22) PCT Filed: Sep. 27, 2018

(86) PCT No.: PCT/JP2018/035949
§ 371 (c)(1),
(2) Date: Jun. 29, 2020

(87) PCT Pub. No.: WO2019/193778
PCT Pub. Date: Oct. 10, 2019

(65) Prior Publication Data
US 2020/0324365 A1    Oct. 15, 2020

(30) Foreign Application Priority Data
Apr. 2, 2018 (JP) ................................ 2018-070622

(51) Int. Cl.
*B23K 20/12* (2006.01)
(52) U.S. Cl.
CPC ............................... *B23K 20/1245* (2013.01)

(58) Field of Classification Search
None
See application file for complete search history.

(56) References Cited

U.S. PATENT DOCUMENTS

| | | | |
|---|---|---|---|
| 5,726,964 A | 3/1998 | Van Kesteren et al. | |
| 5,739,937 A | 4/1998 | Liedenbaum et al. | |
| (Continued) | | | |

FOREIGN PATENT DOCUMENTS

| | | |
|---|---|---|
| CA | 2 884 230 A1 | 3/2014 |
| CN | 1462220 A | 12/2003 |
| (Continued) | | |

OTHER PUBLICATIONS

International Search Report for No. PCT/JP2018/035949 mailed Dec. 18, 2018.

(Continued)

*Primary Examiner* — Erin B Saad
*Assistant Examiner* — Carlos J Gamino
(74) *Attorney, Agent, or Firm* — Merchant & Gould P.C.

(57) ABSTRACT

A method for manufacturing a liquid cooling jacket has a feature of using a primary joining rotary tool provided with a tip side pin and a base side pin having a taper angle larger than a taper angle of the tip side pin and comprising a first primary joining process in which inserting the tip side pin and the base side pin of the rotary tool that is rotating into the sealing body member and moving the rotary tool along the first abutted portion with an outer circumferential face of the base side pin being in contact with a front face of the sealing body member and with the outer circumferential face of the tip side pin being kept off a step side face of the peripheral wall step portion while having a second aluminum alloy of the sealing body member flow into the gap.

15 Claims, 20 Drawing Sheets

(56) References Cited

U.S. PATENT DOCUMENTS

| | | | |
|---|---|---|---|
| 6,305,866 B1 * | 10/2001 | Aota | B23K 20/126 |
| | | | 296/29 |
| 6,325,273 B1 | 12/2001 | Boon et al. | |
| 6,421,578 B1 | 7/2002 | Adams et al. | |
| 6,669,075 B2 | 12/2003 | Colligan | |
| 7,275,675 B1 | 10/2007 | Carter et al. | |
| 7,494,040 B2 | 2/2009 | Babb et al. | |
| 7,857,192 B2 | 12/2010 | Nagano | |
| 8,434,661 B2 | 5/2013 | Hovanski et al. | |
| 9,242,308 B2 * | 1/2016 | Peterson | B23K 20/1255 |
| 10,569,356 B1 | 2/2020 | Coffey et al. | |
| 10,835,989 B2 | 11/2020 | Werz et al. | |
| 11,059,125 B2 | 7/2021 | Rosal et al. | |
| 11,141,812 B2 * | 10/2021 | Ikeda | B23K 20/26 |
| 11,185,945 B2 | 11/2021 | Hori et al. | |
| 11,185,946 B2 | 11/2021 | Hori et al. | |
| 11,413,700 B2 * | 8/2022 | Hori | B23K 20/122 |
| 11,419,237 B2 * | 8/2022 | Hori | B23K 20/1255 |
| 2002/0000461 A1 * | 1/2002 | Jogan | B23K 20/123 |
| | | | 228/2.1 |
| 2003/0024965 A1 * | 2/2003 | Okamura | B23K 33/00 |
| | | | 228/112.1 |
| 2003/0209588 A1 | 11/2003 | Colligan | |
| 2004/0108359 A1 | 6/2004 | Hashimoto et al. | |
| 2005/0246884 A1 * | 11/2005 | Chen | B23K 33/004 |
| | | | 29/525 |
| 2006/0086775 A1 | 4/2006 | Trapp et al. | |
| 2006/0151576 A1 * | 7/2006 | Akiyama | B23K 20/123 |
| | | | 228/112.1 |
| 2006/0175382 A1 * | 8/2006 | Packer | B23K 20/1255 |
| | | | 228/2.1 |
| 2006/0289608 A1 * | 12/2006 | Steel | B23K 20/22 |
| | | | 228/101 |
| 2007/0241163 A1 | 10/2007 | Valant et al. | |
| 2008/0067215 A1 | 3/2008 | Gendou | |
| 2008/0154423 A1 | 6/2008 | Badarinarayan et al. | |
| 2008/0251571 A1 | 10/2008 | Burford | |
| 2009/0072007 A1 | 3/2009 | Nagano | |
| 2010/0081005 A1 | 4/2010 | Aoh et al. | |
| 2010/0282822 A1 | 11/2010 | Nagano | |
| 2011/0127311 A1 * | 6/2011 | Peterson | B23K 37/0533 |
| | | | 228/2.1 |
| 2011/0180587 A1 | 7/2011 | Trapp et al. | |
| 2012/0153007 A1 | 6/2012 | Sall et al. | |
| 2012/0273113 A1 * | 11/2012 | Hovanski | B23K 20/1255 |
| | | | 228/112.1 |
| 2013/0068825 A1 * | 3/2013 | Rosal | B23K 20/26 |
| | | | 228/2.1 |
| 2014/0166731 A1 * | 6/2014 | Seo | B23K 20/1265 |
| | | | 228/112.1 |
| 2014/0367452 A1 * | 12/2014 | Dinda | B23K 20/122 |
| | | | 228/112.1 |
| 2015/0041521 A1 * | 2/2015 | Matsushita | C22C 38/04 |
| | | | 228/112.1 |
| 2015/0097020 A1 | 4/2015 | Rosal et al. | |
| 2015/0174697 A1 | 6/2015 | Fukuda | |
| 2015/0290739 A1 | 10/2015 | Seo et al. | |
| 2016/0325374 A1 | 11/2016 | Hori et al. | |
| 2017/0216961 A1 | 8/2017 | Utter et al. | |
| 2018/0043465 A1 * | 2/2018 | Hori | B23K 20/1225 |
| 2018/0214975 A1 | 8/2018 | Werz et al. | |
| 2018/0272479 A1 * | 9/2018 | Hori | B23K 20/1265 |
| 2019/0039168 A1 | 2/2019 | Hori et al. | |
| 2019/0210148 A1 * | 7/2019 | Luszczak | B23K 20/122 |
| 2019/0283174 A1 | 9/2019 | Onose et al. | |
| 2019/0358740 A1 * | 11/2019 | Hori | B23K 20/129 |
| 2020/0147718 A1 | 5/2020 | Hori et al. | |
| 2020/0164462 A1 | 5/2020 | Hori et al. | |
| 2020/0353557 A1 | 11/2020 | Hori et al. | |
| 2021/0053144 A1 | 2/2021 | Hori et al. | |
| 2021/0146472 A1 | 5/2021 | Hori et al. | |
| 2021/0146473 A1 | 5/2021 | Hori et al. | |
| 2021/0213561 A1 | 7/2021 | Hori et al. | |
| 2021/0346979 A1 | 11/2021 | Hori et al. | |
| 2021/0370433 A1 | 12/2021 | Hori et al. | |

FOREIGN PATENT DOCUMENTS

| | | | | |
|---|---|---|---|---|
| CN | 1654154 A | 8/2005 | | |
| CN | 101670481 A | 3/2010 | | |
| CN | 102317027 A | 1/2012 | | |
| CN | 102574239 A | 7/2012 | | |
| CN | 103521912 A | 1/2014 | | |
| CN | 103949769 A | 7/2014 | | |
| CN | 104014926 A | 9/2014 | | |
| CN | 104227222 A | 12/2014 | | |
| CN | 104507630 A | 4/2015 | | |
| CN | 104646820 A | 5/2015 | | |
| CN | 105772935 A | 7/2016 | | |
| CN | 105899321 A | 8/2016 | | |
| CN | 107000114 A | 8/2017 | | |
| CN | 111032268 A | 4/2020 | | |
| CN | 113020776 B * | 3/2023 | | B23K 20/122 |
| DE | 20 2012 001 704 U1 | 5/2013 | | |
| DE | 10 2012 001 877 A1 | 8/2013 | | |
| DE | 10 2013 000 574 A1 | 7/2014 | | |
| EP | 1 400 302 A1 | 3/2004 | | |
| EP | 2 835 209 A1 | 2/2015 | | |
| IN | 203209851 U | 9/2013 | | |
| JP | 11-267859 A | 10/1999 | | |
| JP | 2000-246465 A | 9/2000 | | |
| JP | 2001-269779 A | 10/2001 | | |
| JP | 2002-346766 A | 12/2002 | | |
| JP | 2003-48083 A | 2/2003 | | |
| JP | 2004-314115 A | 11/2004 | | |
| JP | 2006-212651 A | 8/2006 | | |
| JP | 2007-160370 A | 6/2007 | | |
| JP | 2008-73693 A | 4/2008 | | |
| JP | 2008-279513 A | 11/2008 | | |
| JP | 4210148 B2 | 1/2009 | | |
| JP | 2009-297761 A | 12/2009 | | |
| JP | 2010-036230 A | 2/2010 | | |
| JP | 2010-201484 A | 9/2010 | | |
| JP | 2012-125822 A | 7/2012 | | |
| JP | 2012-218001 A | 11/2012 | | |
| JP | 2013-27923 A | 2/2013 | | |
| JP | 2013-39613 A | 2/2013 | | |
| JP | 2015-131321 A | 7/2015 | | |
| JP | 2015-131323 A | 7/2015 | | |
| JP | 2016-087649 A | 5/2016 | | |
| JP | 2016-87650 A | 5/2016 | | |
| JP | 2016-150380 A | 8/2016 | | |
| JP | 2016-215264 A | 12/2016 | | |
| JP | 2017-42817 A | 3/2017 | | |
| KR | 20110088266 A * | 8/2011 | | |
| KR | 10-2016-0071483 A | 6/2016 | | |
| TW | 294810 B1 * | 3/2008 | | |
| WO | 2007/119343 A1 | 10/2007 | | |
| WO | 2009/104426 A1 | 8/2009 | | |
| WO | 2015/107716 A1 | 7/2015 | | |
| WO | 2016/072211 A1 | 5/2016 | | |
| WO | 2016/163214 A1 | 10/2016 | | |
| WO | WO-2020095483 A1 * | 5/2020 | | B23K 20/122 |
| WO | WO-2020158081 A1 * | 8/2020 | | |

OTHER PUBLICATIONS

International Search Report for No. PCT/JP2018/002207, mailed Apr. 17, 2018.

International Search Report for No. PCT/JP2018/018951 mailed Jun. 19, 2018.

International Search Report for No. PCT/JP2018/018966 mailed Jun. 19, 2018.

International Search Report for No. PCT/JP2018/027337, mailed Oct. 2, 2018.

International Search Report for No. PCT/JP2018/027338, mailed Oct. 2, 2018.

International Search Report for No. PCT/JP2018/028833, mailed Oct. 2, 2018.

(56) References Cited

OTHER PUBLICATIONS

International Search Report for No. PCT/JP2018/030412, mailed Oct. 2, 2018.
International Search Report for No. PCT/JP2019/018216 mailed Jul. 9, 2019.
International Search Report for No. PCT/JP2019/023829 mailed Sep. 10, 2019.
International Search Report and Written Opinion for No. PCT/JP2018/035959 mailed Dec. 25, 2018.
Office Action for Chinese Patent Application No. 201880029621.9, mailed Dec. 17, 2020.
Office Action for Chinese Patent Application No. 201880053294.0 (Jul. 19, 2021).
Office Action for Chinese Patent Application No. 201880053448.6 (Mar. 3, 2021).
Office Action for Chinese Patent Application No. 201880076427.6, mailed Jun. 1, 2021.
Office Action for Chinese Patent Application No. 201880081181.1 (May 2, 2021).
Office Action for Chinese Patent Application No. 201980035227.0 (Sept. 3, 2021).
Office Action for corresponding CN Application No. 201980035227.0 (Apr. 12, 2022).
Rejection Decision issued for Chinese Patent Application No. 201880029534.3. (Mar. 3, 2022).
Search Report for European Patent Application No. 18878273.4 (Jul. 15, 2021).
Search Report for European Patent Application No. 19898076.5 (Aug. 24, 2022).
U.S. Appl. No. 16/624,250, filed Dec. 18, 2019, 2021-0146473 A1, May 20, 2021.
U.S. Appl. No. 16/622,559, filed Dec. 13, 2019, 2021-0146472 A1, May 20, 2021.
U.S. Appl. No. 16/624,256, filed Dec. 18, 2019, 2020-0164462 A1, May 28, 2020.
U.S. Appl. No. 16/753,735, filed Apr. 3, 2020, U.S. Pat. No. 11,185,945, B2, Nov. 30, 2021.
U.S. Appl. No. 16/753,741, filed Apr. 3, 2020, U.S. Pat. No. 11,185,946 B2, Nov. 30, 2021.
U.S. Appl. No. 16/640,646, filed Feb. 20, 2020, 2020-0353557 A1, Nov. 12, 2020.
U.S. Appl. No. 16/640,661, filed Feb. 20, 2020, U.S. Pat. No. 11,419,237 B2, Aug. 16, 2022.
U.S. Appl. No. 17/044,271, filed Sep. 30, 2020, 2021-0053144 A1, Feb. 25, 2021.
U.S. Appl. No. 17/058,601, filed Nov. 24, 2020, U.S. Pat. No. 11,413,700 B2, Aug. 16, 2022.
U.S. Appl. No. 17/285,062, filed Apr. 13, 2021, 2021-0346979 A1, Nov. 11, 2021.

* cited by examiner

FIG. 18
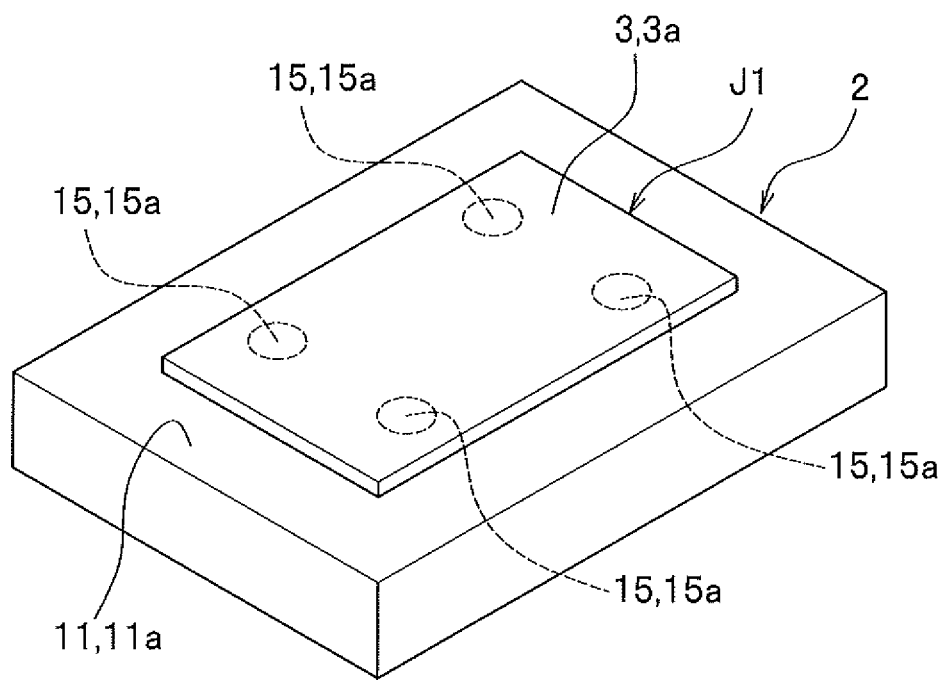
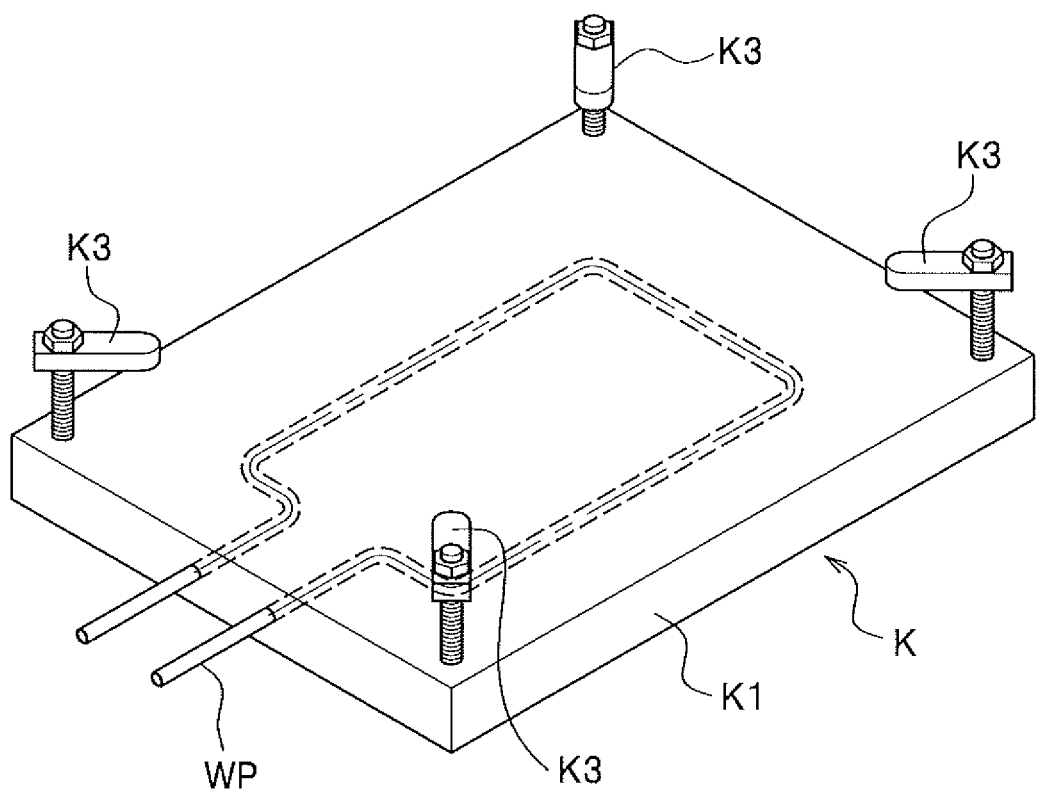

FIG. 21
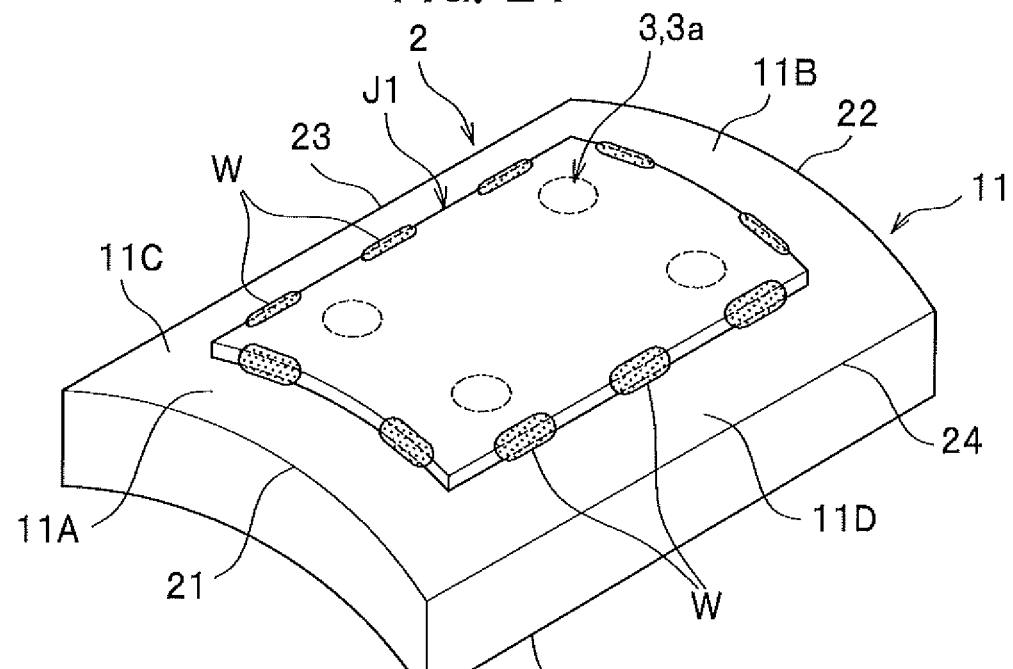
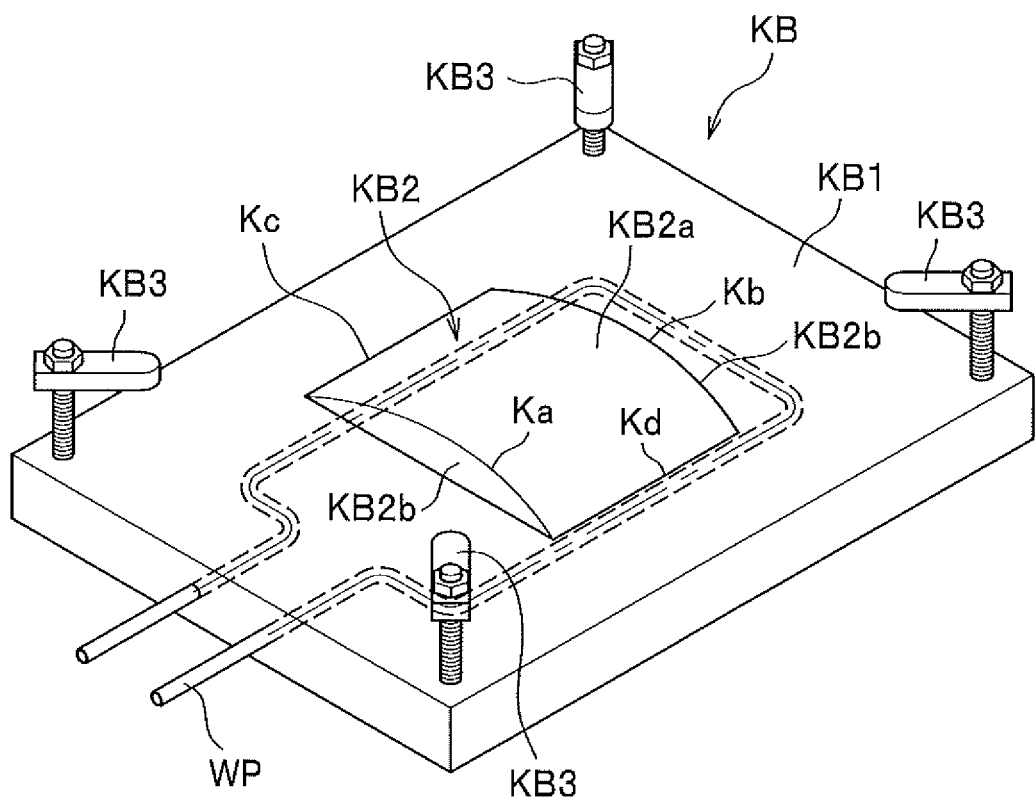

METHOD FOR MANUFACTURING LIQUID-COOLING JACKET USING A ROTARY TOOL WITH A PIN STEP PORTION ON A BASE SIDE PIN AND A SPIRAL GROOVE ON A TIP SIDE PIN

This application is a National Stage Application of PCT/JP2018/035949, filed Sep. 27, 2018, which claims benefit of priority to Japanese Patent Application No. 2018-070622, filed Apr. 2, 2018, which applications are incorporated herein by reference. To the extent appropriate, a claim of priority is made to each of the above disclosed applications.

TECHNICAL FIELD

The present invention relates to a method for manufacturing a liquid-cooling jacket.

BACKGROUND ART

For instance, Patent Document 1 discloses a method for manufacturing a liquid-cooling jacket. FIG. 22 is a cross-sectional view of a conventional method for manufacturing a liquid-cooling jacket. According to this conventional method for manufacturing the liquid-cooling jacket, friction-stir-welding is performed on an abutted portion J10 at which a step side face 101c formed at a step portion of a jacket body member 101 of an aluminum alloy and a side face 102c of a sealing body member 102 of an aluminum alloy abut each other. In addition, the friction-stir-welding is performed by inserting only a stirring pin F02 of a rotary tool F0 into the abutted portion J10. Furthermore, according to the conventional method for manufacturing the liquid-cooling jacket, the rotary tool F10 is moved in translation with a rotation center axis CL being aligned with the abutted portion J10.

PRIOR ART DOCUMENT

Patent Document

Patent Document 1: JP2015-131321A

SUMMARY OF THE INVENTION

Objective of the Invention

Since it is often the case that the jacket body member 101 is in a complicated shape, the jacket body member 101 is made of a casting material such as a 4xxx aluminum alloy material while the sealing body member 102 in a relatively simple shape is made of a wrought aluminum material such as a 1xxx aluminum. Thus, a liquid-cooling jacket is often made by joining members of different aluminum alloys. In a case like this, the jacket body member usually has a higher hardness than the sealing body member, and the stirring pin receives a higher material resistance from the jacket body member 101 than from the sealing body member 102 while the friction-stir-welding is being performed, as shown in FIG. 22. As a result, it is difficult to stir members of different materials to be mixed sufficiently with the stirring pin of the rotary tool F0, and there are cavity defects left in a plasticized region after the joining process, which results in a problem with a lower strength of the joined portion.

In order to solve this problem, the present invention is intended to provide a method for manufacturing a liquid-cooling jacket of members of different aluminum alloy materials that are appropriately joined in a desirable manner.

Means to Achieve the Objective

In order to achieve the objective as mentioned, the present invention has a feature of A method for manufacturing a liquid cooling jacket joining a jacket body member and a sealing body member through friction-stirring, wherein the jacket body member includes a bottom portion and a peripheral wall portion extending vertically upward from a peripheral edge portion of the bottom portion, and is made of a first aluminum alloy, the sealing body member seals an opening of the jacket body member and is made of a second aluminum alloy, the first aluminum alloy has a higher hardness than a hardness of the second aluminum alloy, a rotary tool is a rotary tool for primary joining for the friction stirring and includes a base side pin and a tip side pin, the base pin has a taper angle larger than that of the tip side pin, and the rotary tool includes a pin step portion formed in a staircase shape on an outer circumferential face of the base side pin, the method comprising a preparation process of forming along an inner peripheral edge of the peripheral wall portion a peripheral wall step portion including a step bottom face and a step side face extending upward toward the opening of the jacket body member from the step bottom face inclining outward, forming a plate thickness of the sealing body member is larger than a height of the step side face of the peripheral wall portion, a placing process of placing the sealing body member on the jacket body member to form a first abutted portion and a second abutted portion, the first abutted portion where the step side face of the peripheral wall portion and an outer peripheral side face of the sealing body member abut each other with a gap formed between the step side face of the outer peripheral wall portion and the outer peripheral side face of the sealing body member, and the second abutted portion where a back face of the sealing body member is placed on the step bottom face of the peripheral wall step portion; and a first primary joining process of friction-stirring being performed by inserting the tip side pin and the base side pin of the rotary tool that is rotating into the sealing body member and moving the rotary tool along the first abutted portion with the outer circumferential face of the base side pin being in contact with a front face of the sealing body member and with an outer circumferential face of the tip side pin being kept off the step side face of the peripheral wall step portion while having the second aluminum alloy of the sealing body member flow into the gap.

This method enables stirring mainly the second aluminum alloy located on a side of the first abutted portion where the sealing body member is to plastically flow due to friction heat between the sealing body member and both of the base side pin and the tip side pin, and joining the step side face and the outer peripheral side face of the sealing body member at the first abutted portion. In addition, since friction-stirring is performed with both the base side pin and the tip side pin being in contact only with the sealing body, the first aluminum alloy of the jacket body member hardly mixes into the sealing body member. As a result, mainly the second aluminum alloy on the sealing body member side at the first abutted portion is friction-stirred and the decrease in the strength of the joined portion is suppressed. In addition, since the step side face of the jacket body member extends upward inclining outward, it is relatively easy to prevent the base side pin and the tip side pin from coming in contact with the jacket body member. Furthermore, since the thickness of the sealing body member is made larger and the gap at the first abutted portion is filled with the plastically flowing material, the joined portion can be prevented from being short of metal.

In addition, friction-stirring is performed preferably by moving the rotary tool along the first abutted portion with a small tip portion of the tip side pin being positioned across the step bottom face.

The method as described enables making the strength of the joined portion higher.

In addition, the present invention has a feature of a method for manufacturing a liquid cooling jacket joining a jacket body member and a sealing body member through friction-stirring, wherein the jacket body member includes a bottom portion and a peripheral wall portion extending vertically upward from a peripheral edge portion of the bottom portion and is made of a first aluminum alloy, the sealing body member seals an opening of the jacket body member and is made of a second aluminum alloy, the first aluminum alloy has a higher hardness than a hardness of the second aluminum alloy, a rotary tool is a rotary tool for primary joining for the friction stirring and includes a base side pin and a tip side pin, the base pin has a taper angle larger than that of the tip side pin, and the rotary tool includes a pin step portion formed in a staircase shape on an outer circumferential face of the base side pin, the method comprising a preparation process of forming along an inner peripheral edge of the peripheral wall portion a peripheral wall step portion including a step bottom face and a step side face extending upward toward the opening of the jacket body member from the step bottom face inclining outward, forming a plate thickness of the sealing body member is larger than a height of the step side face of the peripheral wall step portion, a placing process of placing the sealing body member on the jacket body member to form a first abutted portion and a second abutted portion, the first abutted portion where the step side face of the peripheral wall portion and an outer peripheral side face of the sealing body member abut each other with a gap formed between the step side face of the peripheral wall portion and the outer peripheral side face of the sealing body member, and the second abutted portion where a back face of the sealing body member is placed on the step bottom face of the peripheral wall step portion, and a first primary joining process of friction-stirring being performed by inserting the tip side pin and the base side pin of the rotary tool that is rotating into the sealing body member and moving the rotary tool along the first abutted portion with the outer circumferential face of the base side pin being in contact with a front face of the sealing body member and with an outer circumferential face of the tip side pin being slightly in contact with the step side face of the peripheral wall step portion while having the second aluminum alloy of the sealing body member flow into the gap.

This method enables stirring mainly the second aluminum alloy located on a side of the first abutted portion where the sealing body member is to plastically flow due to friction heat between the sealing body member and both of the base side pin and the tip side pin, and joining the step side face and the outer peripheral side face of the sealing body member at the first abutted portion. Since the outer circumferential faces of the base side pin and the tip side pin are slightly in contact with the step side face of the jacket body member, only a small amount of the first aluminum alloy of the jacket body member can mix into the sealing body member. In addition, since the step side face of the jacket body member extends upward inclining outward, the first abutted portion can be joined without having large portions of the base side portion and the tip side portions positioned on a side of the first abutted portion where the jacket body member is. Furthermore, since the thickness of the sealing body member is made larger and the gap at the first abutted portion is filled with the plastically flowing material, the joined portion can be prevented from being short of metal.

In addition, the friction-stirring in the first primary joining process is performed by moving the rotary tool along the first abutted portion with the tip side pin being slightly in contact with the step bottom face in the first primary joining process.

This method as described enables enhancing the strength of the joined portion.

In addition, the friction-stirring is performed by moving the rotary tool one round along the first abutted portion in the first primary joining process.

This method as described can improve a water-tightness property and a gas-tightness property of the liquid cooling jacket.

In addition, it is preferable that the jacket body member is formed through die-casting, the bottom portion of the jacket body member is formed in a raised shape with a front face of the bottom portion being raised and the sealing body member is formed in a raised shape with a front face of the sealing body member being raised, in the preparation process.

There is a risk that the liquid cooling jacket deforms into a recessed shape to have the sealing body member sagging due to thermal contraction of the plasticized region that is heated by friction-stirring. However, since the jacket body member and the sealing body member are formed in the raised shape in advance, this method as described enables making the liquid cooling jacket flat due to the thermal contraction.

In addition, a deformation amount of the jacket body member is measured in advance and the friction-stirring is performed while an insertion depth of the base side pin and the tip side pin of the rotary tool is being adjusted in accordance with the deformation amount in the first primary joining process.

The method as described enables keeping the length and the width of the plasticized region constant even when friction-stir-welding is performed with the jacket body member and the sealing body member being curved in the raised shape.

In addition, a provisional joining process to provisionally join the first abutted portion is preferably performed prior to the first primary joining process.

The method as described including the provisional joining process can prevent a gap from being formed at the first abutted portion.

In addition, it is preferable that a cooling plate in which a refrigerant medium flows is fixed on a back face of the bottom portion and the friction-stirring is performed while the jacket body member and the sealing body member are being cooled by the cooling plate, in the first primary joining process.

The method as described can dissipate friction heat and decrease deformation of the liquid cooling jacket to be caused by the thermal contraction.

In addition, a front face of the cooling plate is preferably made to be in face-contact with the back face of the bottom portion. This method can enhance cooling efficiency.

In addition, the cooling plate includes preferably a refrigerant passage, through which the refrigerant medium flows and the refrigerant passage, has a planar shape that corresponds to a moving track along which the rotary tool moves in the first primary joining process.

Since the method as described enables intensively cooling the portion that is being friction-stirred, the cooling efficiency is further enhanced.

In addition, the refrigerant passage through which the refrigerant medium flows is constituted preferably by a cooling pipe that is embedded in the cooling plate.

The method as described enables easily controlling the refrigerant medium.

In addition, in the first primary joining process, the friction-stirring is preferably performed while the jacket main body member and the sealing body member are being cooled by a refrigerant medium being made to flow in a hollow formed by the jacket body member and the sealing body member.

The method as described enables dissipating the friction heat and making small the deformation of the liquid cooling jacket caused by thermal contraction.

The cooling is performed by using the jacket body member without using the cooling plate and the like.

Effect of the Invention

The method for manufacturing a liquid-cooling jacket of the present invention enables joining different aluminum alloys in a desirable manner.

BRIEF DESCRIPTION OF DRAWINGS

FIG. 18 is a perspective view of a first modification example of a method for manufacturing a liquid-cooling jacket of the first embodiment of the present invention.

FIG. 21 shows the third example of the method for manufacturing a liquid-cooling jacket of the first embodiment of the present invention and is a perspective view of a jacket body member and a sealing body member being clamped to a table.

EMBODIMENT FOR PRACTICING THE INVENTION

Figure 1:
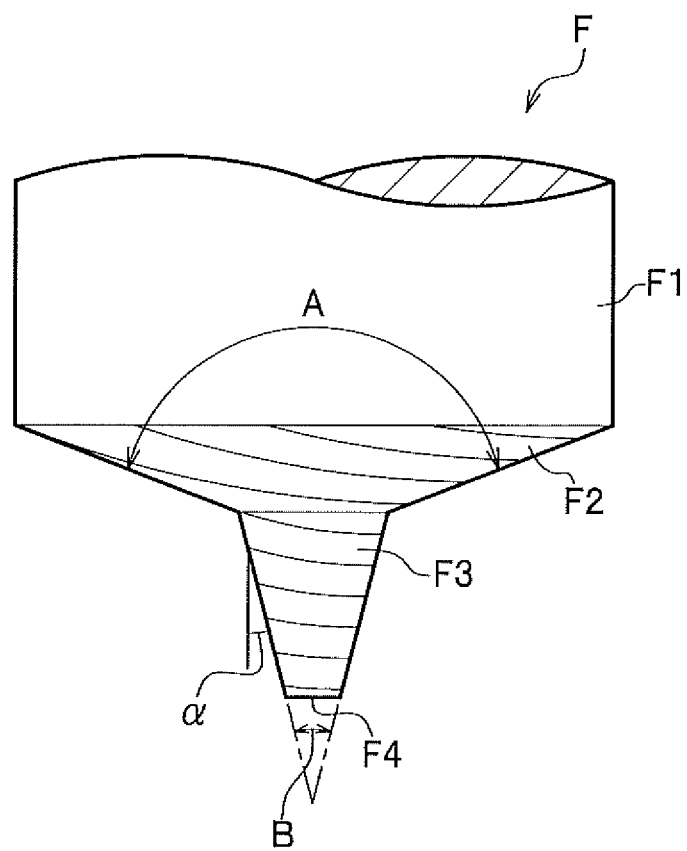
FIG. 1 is a side elevation view of a primary joining rotary tool of an embodiment of the present invention.

An embodiment of the present invention is described appropriately with reference to the drawings. To begin with, a primary joining rotary tool (rotary tool) used for a joining method of this embodiment. The primary joining rotary tool is intended to be used for friction-stir-welding. As shown in FIG. 1, the primary joining rotary tool F is made of, for example, tool steel and consists mainly of a base shaft portion F1, a base side pin F2 and a tip side pin F3. The base shaft pin F1 is in a columnar shape and connected with a main shaft of a friction stir welding apparatus.

Figure 2:
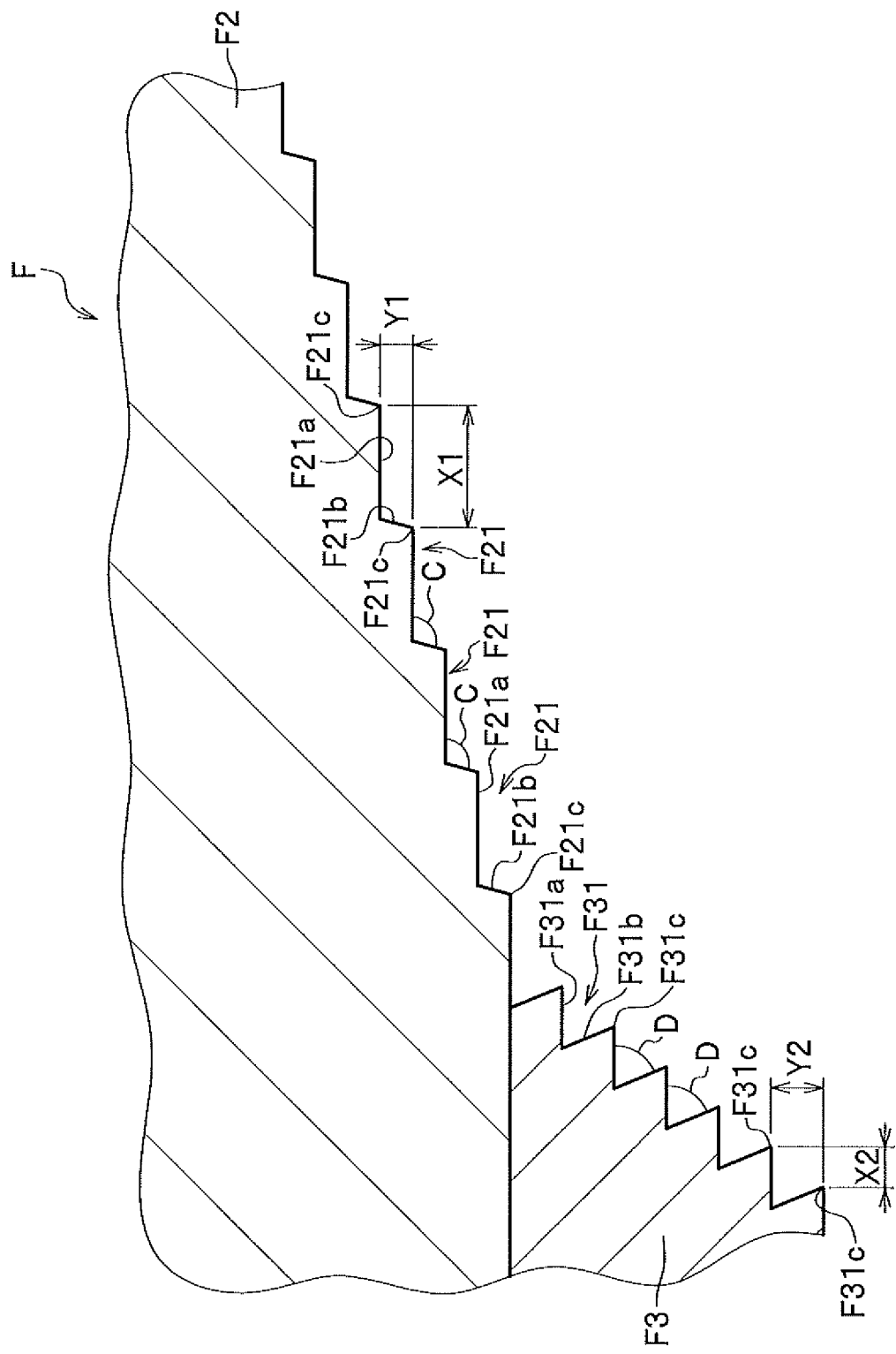
FIG. 2 is an enlarged cross-sectional view of the primary joining rotary tool.

The base side pin F2 is formed to extend from the base shaft portion F1 and tapers toward its tip side. The base side pin F2 is in a conical shape with its tip portion cut off. The base side pin F2 has a taper angle A that may be appropriately set, for example, to between 135° and 160°. If the taper angle A is smaller than 135° or larger than 160°, a joined surface after friction-stirring has a surface roughness that is relatively large. This taper angle A is set to be larger than a taper angle B of the tip side pin F3, which is described later. As shown in FIG. 2, a pin step portion F21 in a staircase shape is formed on an outer circumferential face of the base side pin F2 wholly in its height direction. The pin step portion F21 is formed in a clockwise or counterclockwise spiral shape. That is, the pin step portion F21 is in a spiral shape in its plane view and in a staircase shape in its side view. Since the primary joining rotary tool F is rotated clockwise for this embodiment, the pin step portion F21 is formed in the clockwise shape from a base side to a tip side of the base side pin F2.

If the primary joining rotary tool F rotates counterclockwise, the pin step portion is preferably formed clockwise from the base side to the tip side. This enables reducing an amount of metal coming out of the metal member to be joined, because the plastically flowing material is led toward the tip side of the base side pin F2 by the pin step portion F21. The pin step portion F21 is formed of a step bottom face F21a and a step side face F21b. A distance X1 (horizontal direction distance) between adjacent apexes F21c, F21c on the pin step portion 21 is appropriately set based on a step angle C and a height Y1 of the step side face F21b, which are described later.

The height Y1 of the step side face F21b may be preferably set, for example, to between 0.1 and 0.4 mm. If the height Y1 is less than 0.1 mm, the joined surface has a relatively large surface roughness. On the other hand, if the height Y1 is more than 0.4 mm, the joined surface tends to have a relatively large surface roughness and the number of effective steps (number of steps of the pin step portion F21 in contact with the metal member to be joined) becomes fewer.

The step angle C made between the step bottom face F21a and the step side face F21b may appropriately set and, for example, set to between 85° and 120°. The step bottom face F21a is in this embodiment is in parallel with a horizontal plane. The step bottom face F21a may be inclined from between −5° and 15° relative to the horizontal plane from a rotation axis of the rotary tool toward its outer circumference (a minus angle corresponds to the step bottom face F21a extending outward inclining downward relative to the horizontal plane and a plus angle corresponds to the step bottom face F21a extending outward inclining upward relative to the horizontal plane). The distance X1, the height Y1 of the step side face F21b, the step angle C and the angle of the step bottom face F21a relative to the horizontal plane are set in a manner that the plastically flowing material flows out of the pin step portion F21 without being stuck in and adhering to the pin step portion F21 and is sufficiently held down by the step bottom face F21a for the joined surface to have a relatively small surface roughness.

As shown in FIG. 1, the tip side pin F3 is formed to extend continuously from the base side pin F2. The tip side pin F3 is in a conical shape with its tip portion cut off. The tip side pin F3 has a flat face F4 that is formed on its tip portion and is perpendicular to the rotation axis. The tip side pin F3 has a taper angle B that is smaller than the taper angle A of the base side pin F2. As shown in FIG. 2, a spiral groove F31 is engraved on an outer circumferential face of the tip side pin F3. The spiral groove F31 may be formed clockwise or counterclockwise. Since the primary joining rotary tool F is rotated clockwise in this embodiment, the spiral groove is engraved counterclockwise from a base side to a tip side of the tip side pin F3.

If the primary joining rotary tool F is rotated counterclockwise, the spiral groove F31 is preferably formed clockwise from the base side to the tip side of the tip side pin F3. This enables reducing an amount of metal coming out of the metal member to be joined, because the plastically flowing material is led toward the tip side of the tip side pin F3 by the spiral groove F31. The spiral groove F31 is formed of a spiral bottom face F31a and a spiral side face F31b. A distance X2 denotes a distance (horizontal direction distance) between adjacent apexes F31c, F31c on a pin step portion. A height Y2 denotes a height of the spiral side face F31b. A spiral angle D made between the spiral bottom face F31a and the spiral side face F31b may be formed, for example, to be between 45° and 90°. The spiral groove F31 is intended to function for increasing friction heat by contacting a metal member to be joined and leading the plastically flowing material toward the tip side.

Figure 3:
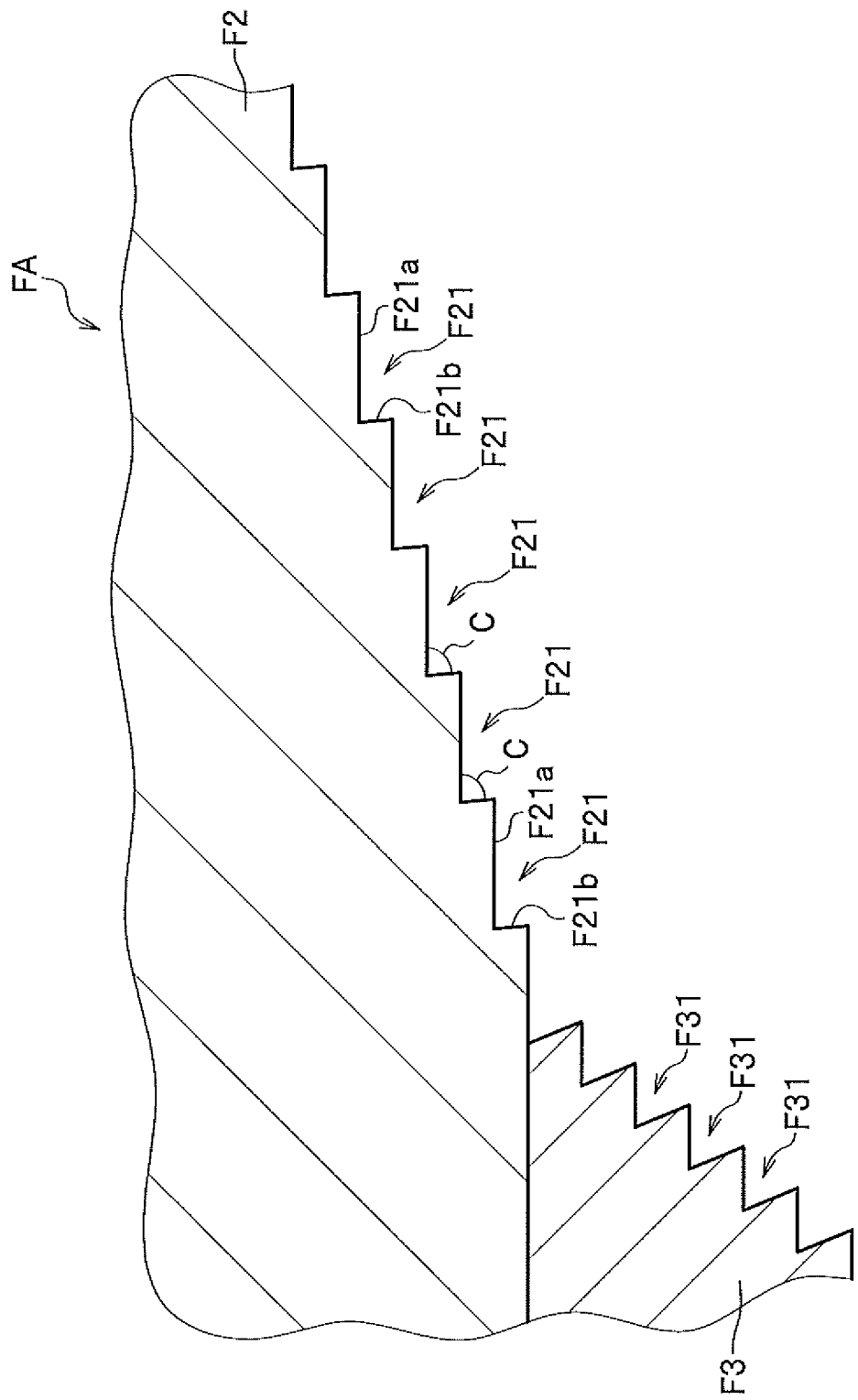
FIG. 3 is a cross sectional view of a rotary tool of a first modification example used for the primary joining.

The configuration of the primary joining rotary tool F may be appropriately modified. FIG. 3 is a side elevation view of a first modification example of the rotary tool of the present invention. As shown in FIG. 3, a primary joining rotary tool FA of the first modification example has the step angle C between the step bottom face F21a of the pin step portion F21 and the pin step side face F21b of the pin step portion F21 being equal to 85°. The step bottom face 21a is in parallel with the horizontal plane. Thus, the step angle C may be set to such an acute angle that the plastically flowing material is able to come out of the pin step portion F21 without being stuck in and adhering to the pin step portion F21 while friction-stirring is being performed, if the step bottom face F21a is in parallel with the horizontal plane.

Figure 4:
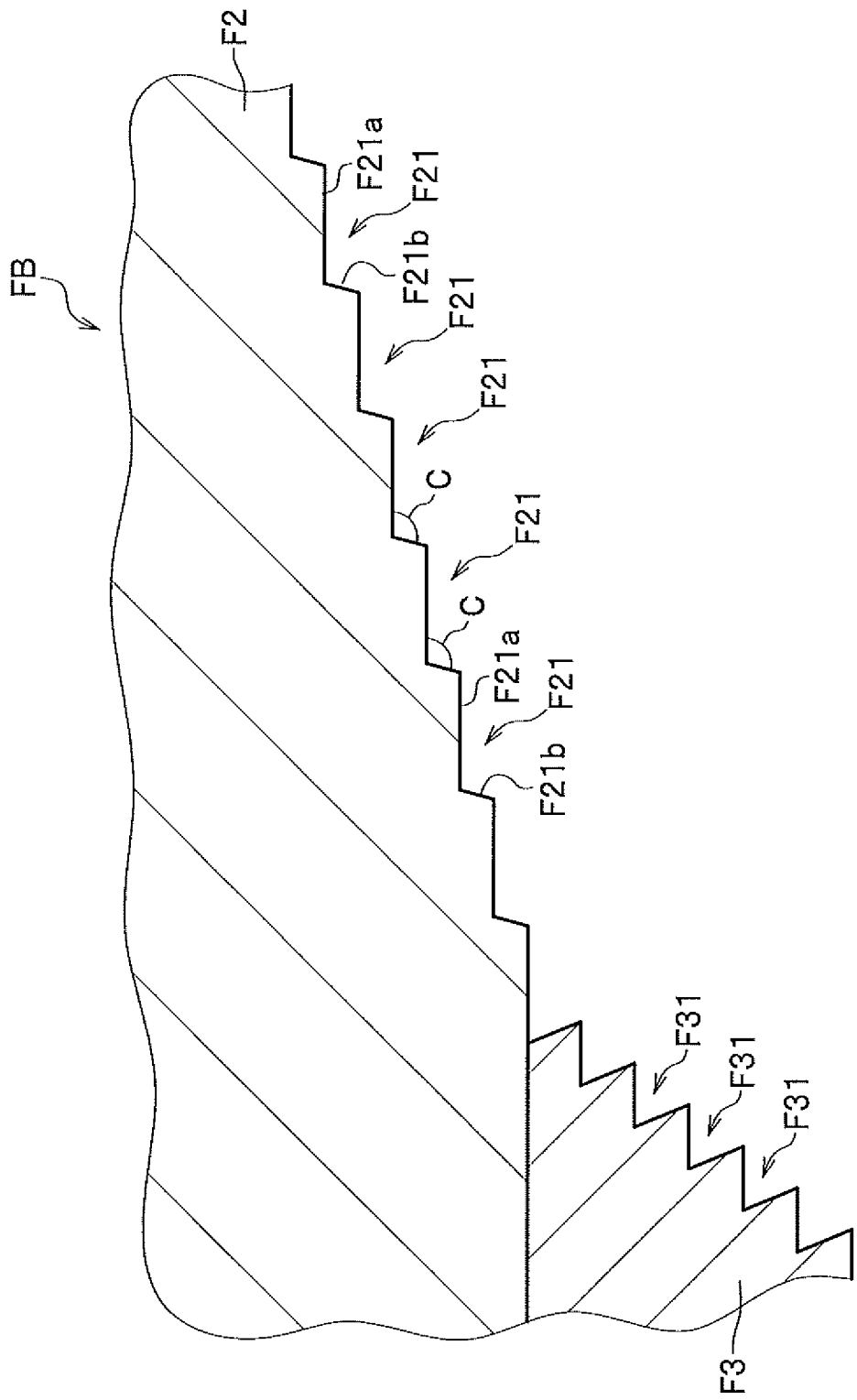
FIG. 4 is a cross sectional view of a rotary tool of a second modification example used for the primary joining.

FIG. 4 is a side elevation view of a second modification example of the primary joining rotary tool of the present invention. As shown in FIG. 4, a primary joining rotary tool FB of the second modification example has the step angle C of the pin step portion F21 being equal to 115°. The step bottom face F21a is in parallel with the horizontal plane. Thus, the step angle C may be set to an obtuse angle as long as the pin step portion F21 functions as intended, if the step bottom face F21a is in parallel with the horizontal plane.

Figure 5:
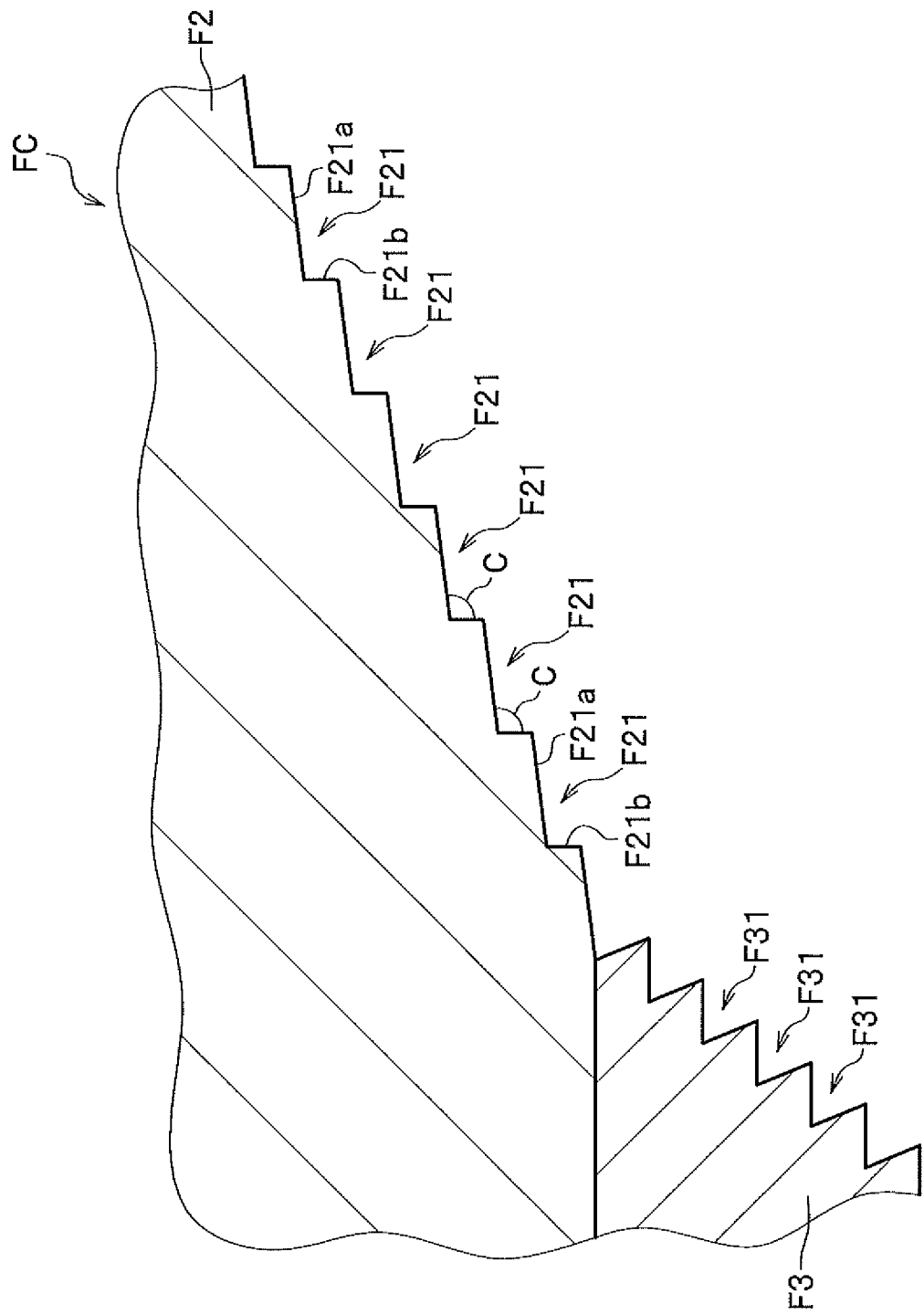
FIG. 5 is a cross sectional view of a rotary tool of a third modification example used for the primary joining.

FIG. 5 is a side elevation view of a third modification example of the primary joining rotary tool of the present invention. As shown in FIG. 5, a primary joining rotary tool FC has the step bottom face F21a extending from a rotation axis side toward an outer periphery inclining upward at 10° to the horizontal plane. The step side face F21b is in parallel with a vertical plane. Thus, the step bottom face F21a may be formed to incline upward relative to the horizontal plane from the rotation axis side toward an outer circumference as long as the plastically flowing material is held down while friction-stirring is being performed. If any of the primary joining tools of the first to third modification examples above mentioned is used, an equivalent effect to that for the embodiments described below is obtained.

First Embodiment

Figure 6:
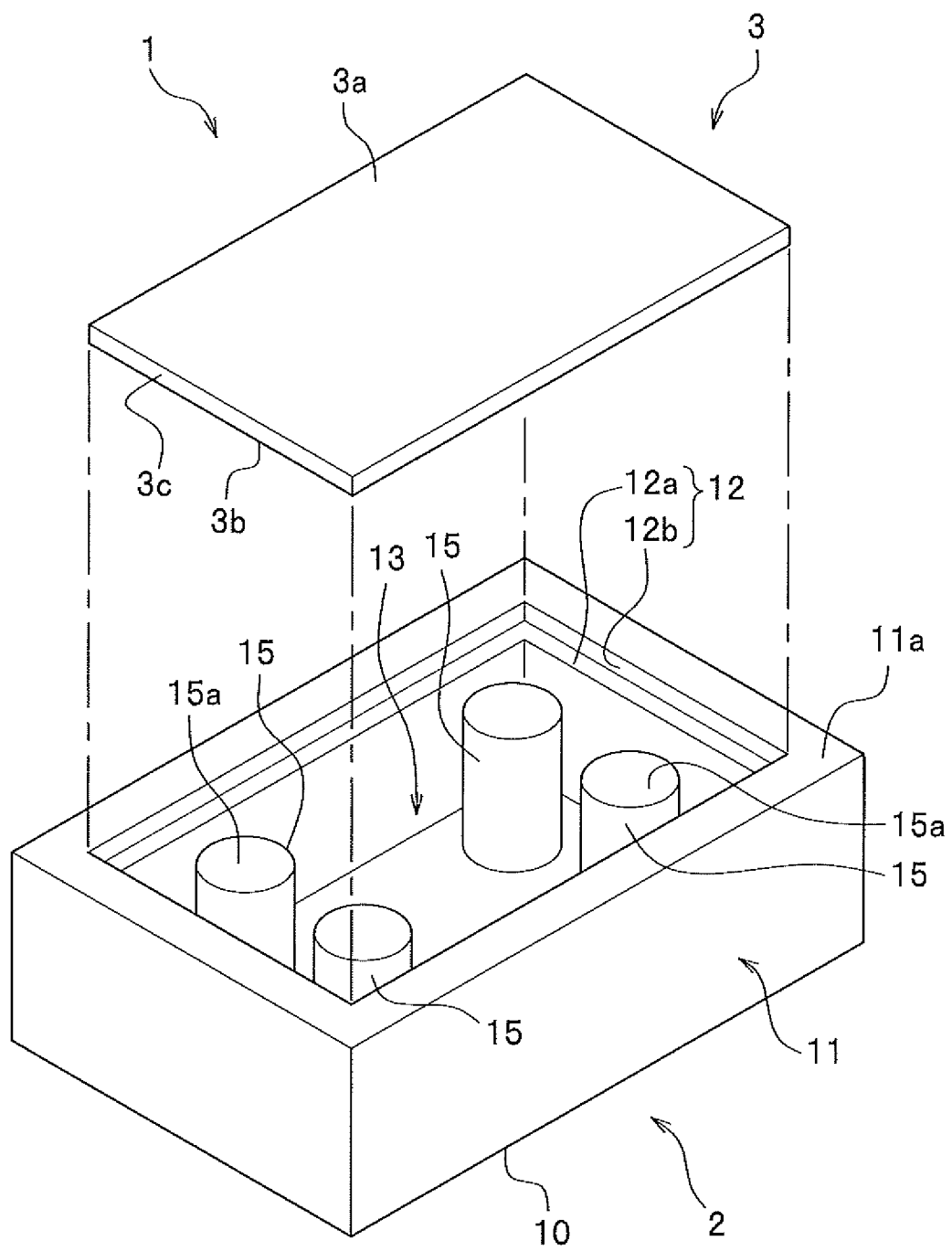
FIG. 6 is a perspective exploded view of a liquid-cooling jacket of the first embodiment of the present invention.

The method for manufacturing a liquid-cooling jacket of the present invention is described in detail with reference to the drawings. As shown in FIG. 6, the method for manufacturing a liquid-cooling jacket 1 of this embodiment is intended to manufacture a liquid-cooling jacket 1 by friction-stir-welding a sealing body member 3 and a jacket body member 2. The liquid-cooling jacket 1 is a device inside which liquid flows and to which heat is transferred from a heat generating body member (not shown) mounted on the sealing body member 3. In the description below, "front face" means an opposite face of "back face".

In the method for manufacturing a liquid-cooling jacket of this embodiment, a preparation process, a placing process, a first primary joining process and a second primary joining process are performed. The preparation process is a process in which the jacket body member 2 and the sealing body member 3 are prepared. The jacket body member 2 includes a bottom portion 10, a peripheral wall portion 11 and plural support pillars 15. The jacket body member 2 is made mainly of a first aluminum alloy. The first aluminum alloy is, for example, an aluminum alloy for casting such as JIS H5302 ADC12 (Al—Si—Cu system).

Figure 7:
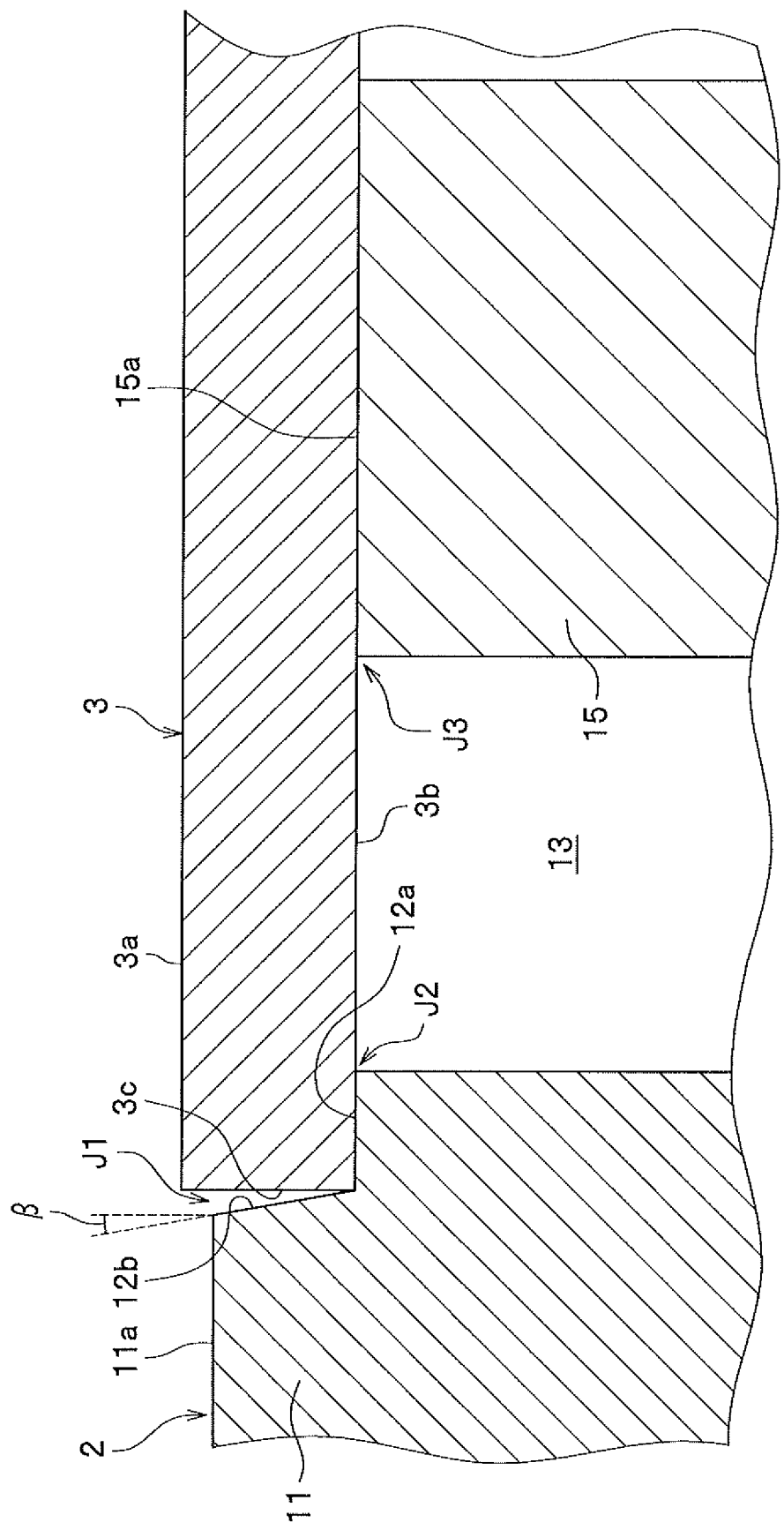
FIG. 7 is a cross-sectional view of a placing process of a method for manufacturing the liquid-cooling jacket of the first embodiment of the present invention.

The bottom portion 10 is a plate-like portion in a rectangular shape in a plan view. The peripheral wall portion 11 is a wall portion extending vertically upward from a peripheral edge portion of the wall portion 10 to be in a rectangular frame shape. A recessed portion 13 is formed of the bottom portion 10 and the peripheral wall portion 11. A peripheral wall step portion 12 is formed along an inner peripheral edge of the peripheral bottom portion 11. The peripheral wall step portion 12 is formed of a step bottom face 12a and a step side face 12b extending upward from the step bottom face 12b. As shown in FIG. 7, the step side face 12b extends upward from the step bottom face 12a toward an opening of the jacket body member 2 inclining outward. An inclination angle β may be appropriately set and is, for example, between 3° and 30° relative to the vertical plane.

As shown in FIG. 6, the support pillars 15 extends vertically from the bottom portion 10. There is no limitation on the number of the support pillars 15, and four support pillars 15 are formed in this embodiment. The support pillars 15 are in a columnar shape in this embodiment and may be in other shape. The support pillars 15 respectively have end faces 15a that are formed at the same height position as the step bottom face 12a is. The jacket body member 2 may be formed by a bottom portion 10 and a peripheral wall portion 11 that are separate members from each other and joined together with a sealing member to seal a joint face.

The sealing body member 3 is a plate-like member to close the opening of the jacket body member 2. The sealing body member 3 is sized to be placed on the peripheral wall step portion 12. The sealing body member 3 has a plate thickness that is larger than a height of the step side face 12b. The sealing body member 3 is made mainly of a second aluminum alloy. The second aluminum alloy is a material having a hardness that is lower than the first aluminum alloy has. The second aluminum alloy may be an aluminum expanded material such as JIS A1050, A1100 or A6063. A thickness of the sealing body member 3 may be appropriately set unless a joint portion is short of metal after a first primary joining process to be described later.

The placing process is a process to place the sealing body member 3 on the jacket body member 2, as shown in FIG. 7. In the placing process, a back face 3b of the sealing body member 3 is put on the step bottom face 12a. As a result, the step side face 12b and an outer peripheral side face 3c of the sealing body member 3 abut each other to form a first abutted portion J1. The step side face 12b and the outer peripheral side face 3c of the sealing body member 3, of which the first abutted portion J1 is formed, may be in face-contact with each other or may abut each other with a gap present therebetween that is seen approximately in a V letter shape in a cross-sectional view as described in the present embodiment. A second abutted portion is formed of the step bottom face 12a and a back face 3b of the sealing body member 3 that are made to abut each other. In addition, third abutted portions J3 are formed of the back face 3b of the sealing body member 3 and the end faces 15a of the support pillars 15 that are made to abut each other.

Figure 8:
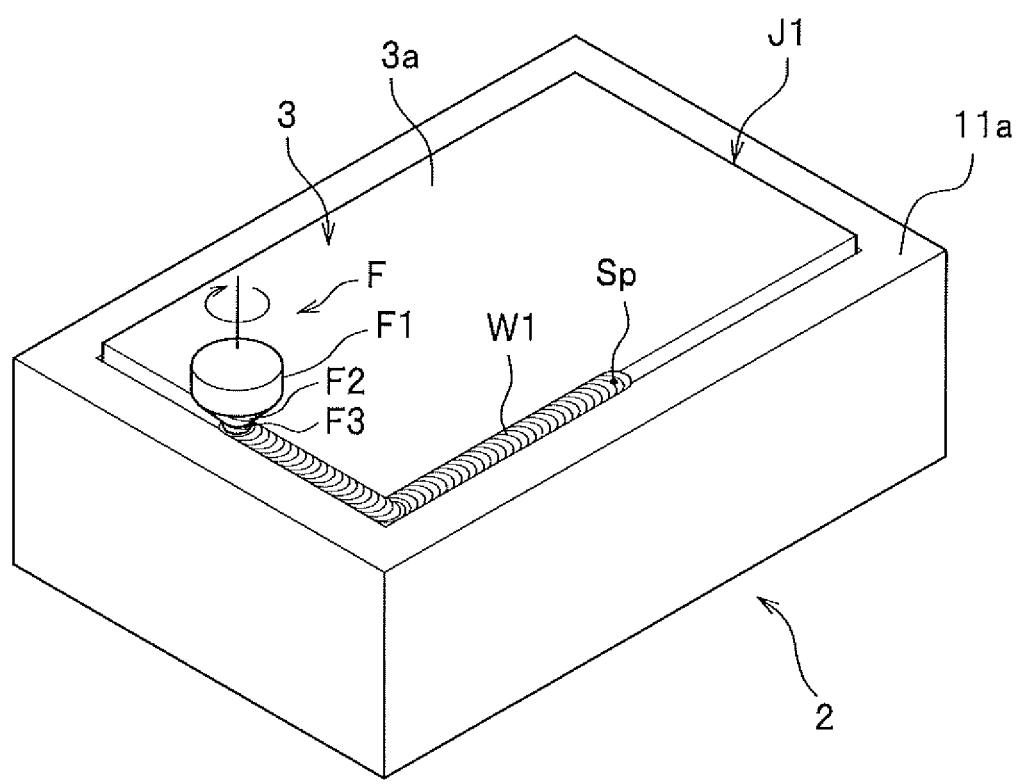
FIG. 8 is a perspective view of a first primary joining process of the method for manufacturing a liquid-cooling jacket of the first embodiment of the present invention.

The first primary joining process is a process to friction-stir-weld the first abutted portion J1 with the primary joining rotary tool F, as shown in FIG. 8. In the first primary joining process, the primary joining rotary tool F that is rotating clockwise is inserted at a starting position Sp predetermined on a front face 3a of the sealing body member 3 and is moved in translation clockwise along the periphery of the sealing body member 3 while having a plastically flowing material flow into the gap in the first abutted portion J1. A plasticized region W1, which is formed of metal that has been friction-stirred, is formed along a moving track along which the primary joining rotary tool F has moved.

Figure 9:
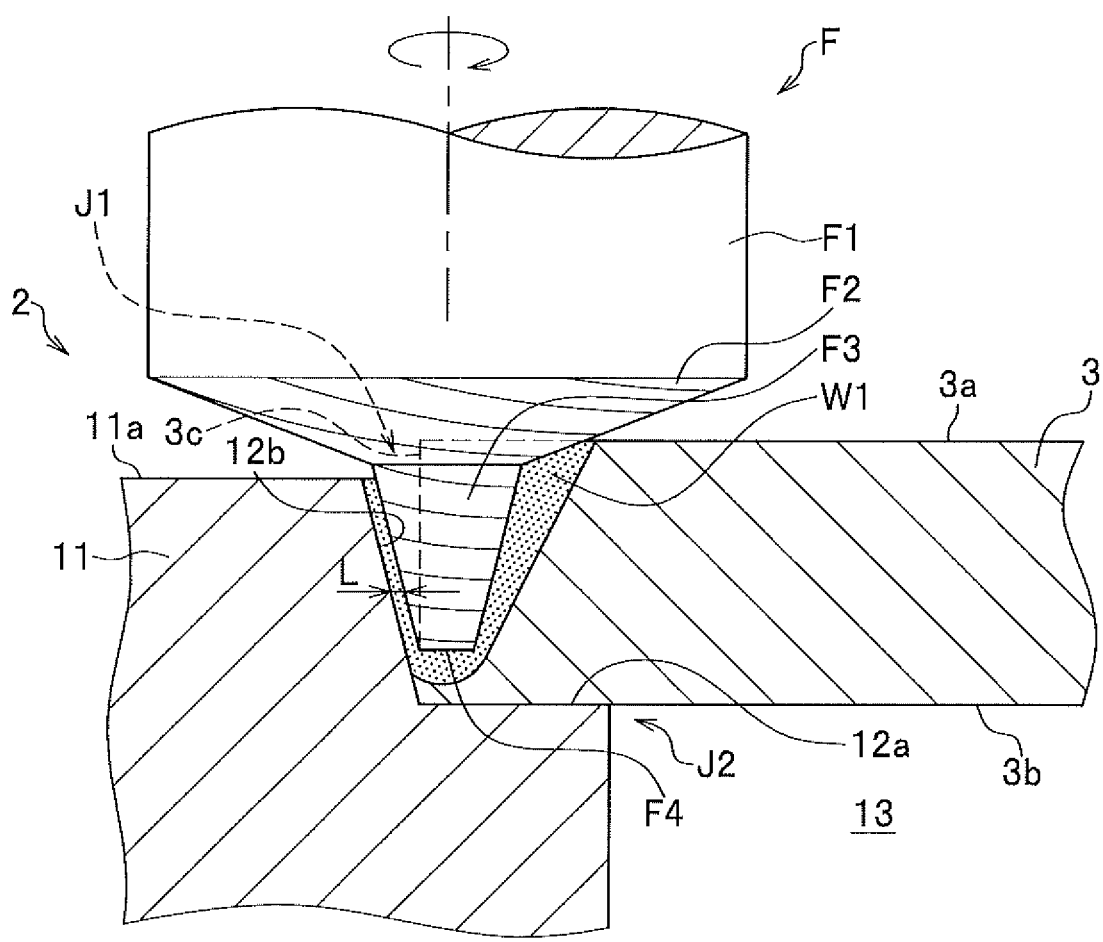
FIG. 9 is a cross-sectional view of the first primary joining process of the method for manufacturing a liquid-cooling jacket of the first embodiment of the present invention.

As shown in FIG. 9, friction-stirring is performed in the first primary joining process with both the base side pin F2 and the tip side pin F3 being in contact with the sealing body member 3 and with both the base side pin F2 and the tip side pin F3 being kept off the step side face 12b. An insertion depth of the primary joining rotary tool F is set to such a depth that friction-stirring is performed with an outer face of the base side pin F2 being in contact with a front face 3a of the sealing body member 3 and with the tip side pin F3 being kept off the step bottom face 12a. The outer circumferential face of the base side pin F2 is kept off a peripheral wall end face 11a. A condition in which the outer circumferential face of the tip side pin F3 is kept off the jacket body member 2 may include a case in which a distance between the tip side pin F3 and the step side face 12b is zero.

If the distance from the step side face 12b to the outer circumferential face of the tip side pin F3 is too large, the strength of the joined first abutted portion J1 lowers. A separation distance L from the step side face 12b to the circumferential face of the tip side pin F3 may be appropriately set based on the materials of the jacket body member 2 and the sealing body member 3, and is $0 \leq L \leq 0.5$ mm, and preferably $0 \leq L \leq 0.3$ mm, if the outer circumferential face of the tip side pin F3 is kept off the step side face 12b and the flat face F4 of the tip side pin F3 is kept off the step bottom face 12a, as is the case with the present embodiment.

Figure 10:
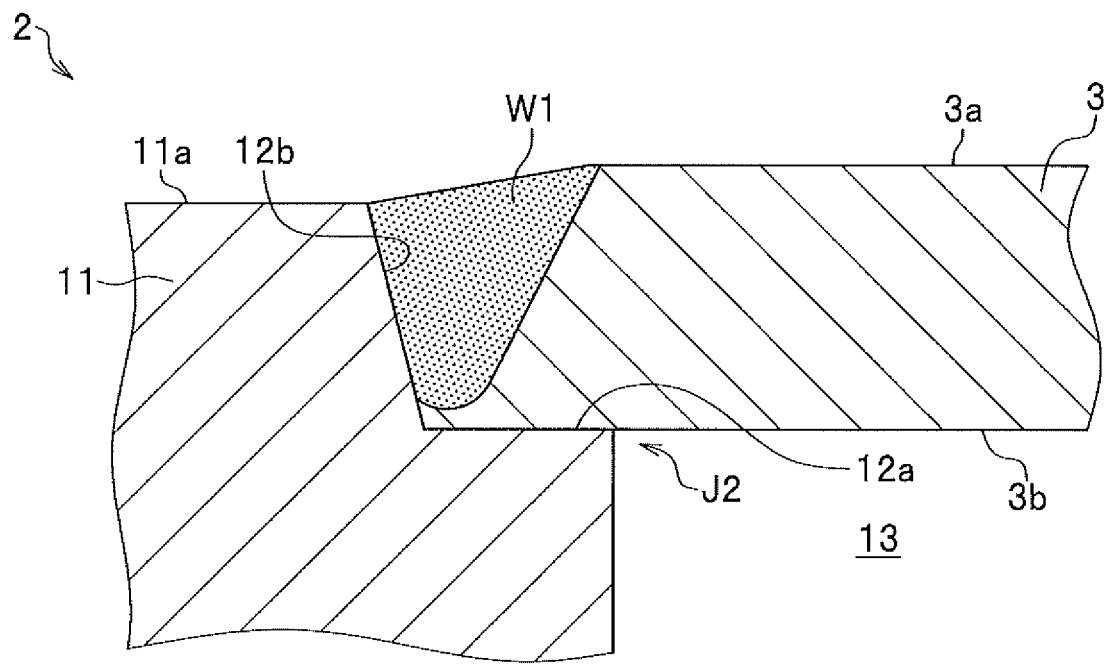
FIG. 10 is a cross-sectional view of joined members after the first primary joining process of the method for manufacturing a liquid-cooling jacket of the first embodiment of the present invention.

After the primary joining rotary tool F is made to move one round along the outer periphery of the sealing body member 3, the primary joining rotary tool F is stopped at the position in the plasticized region W1 from which the primary joining rotary tool F started to move in translation. Then, the primary joining rotary tool F may be lifted gradually upward and pulled out of the front face 3a of the sealing body member 3. FIG. 10 is a cross-sectional view of the joined portion after first primary joining process of the present embodiment. The plasticized region W1 borders the first abutted portion J1 and is formed on a side of the first abutted portion J1 where the sealing body member 3 is.

Figure 11:
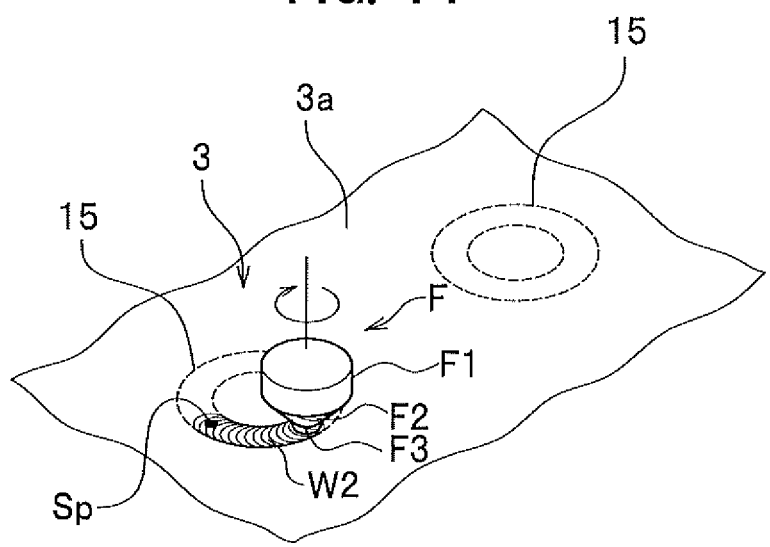
FIG. 11 is a perspective view of a second primary joining process of the method for manufacturing a liquid-cooling jacket of the first embodiment of the present invention.
Figure 12:
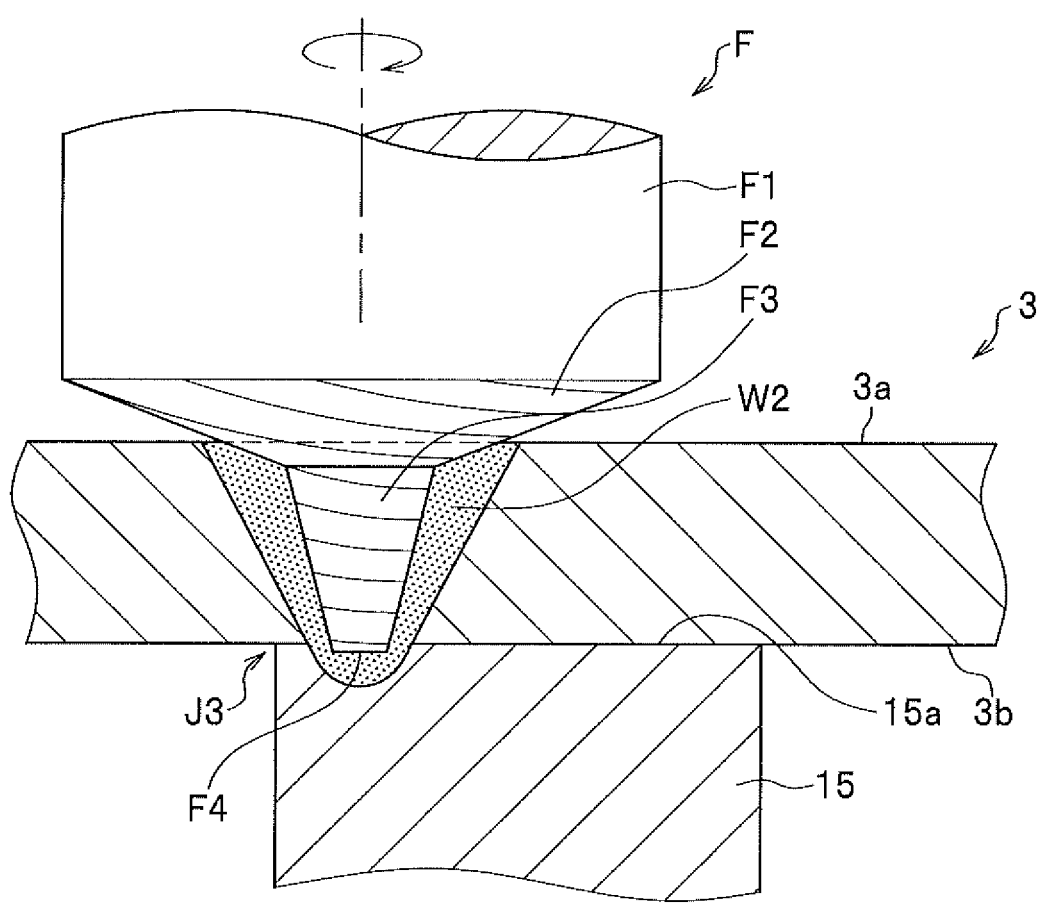
FIG. 12 is a cross-sectional view of the second primary joining process of the method for manufacturing a liquid-cooling jacket of the first embodiment of the present invention.

As shown in FIG. 11 and FIG. 12, the second primary joining process is a process to friction-stir-weld the third abutted portion J3. As shown in FIG. 11, the base side pin F2 and the tip side pin F3 that are rotating clockwise is inserted at a starting position Sp predetermined on the front face 3a of the sealing body member 3 and is moved one round along a track just inside an outer circumferential edge of the support pillar 15. A plasticized region W2 of metals that are friction-stirred and harden is formed along a moving track along which the primary joining rotary tool F has moved.

As shown in FIG. 12, friction-stirring is performed in the second primary joining process with the outer circumferential face of the base side pin F2 being in contact with the front face 3a of the sealing body member 3 and with the tip of the tip side pin F3 being in contact with the end face 15a of the support pillar 15.

After the primary joining rotary tool F is made to move one round along the circumference of the support pillar 15, the primary joining rotary tool F is made to stop in a manner that a start portion of the plasticized region W2 overlaps with an end portion of the plasticized region W2. Then, the primary joining rotary tool F may be lifted gradually upward and pulled out of the front face 3a of the sealing body member 3. The plasticized region W2 is formed to extend across the third abutted portion J3 into the support pillar 15. In the second primary joining process, an insertion depth of the primary joining rotary tool F may be set to such a depth that the outer circumferential face of the base side pin F2 is in contact with the front face 3a of the sealing body member 3 while the tip side pin F3 is not in contact with the end face 15a of the support pillar 15. In this case, the third abutted portion J3 is made to plastically flow by friction heat generated between the tip side pin F3 and the sealing body member 3 and joined.

According to the method for manufacturing the liquid-cooling jacket of this embodiment as has been described, the second aluminum alloy on a side of the first abutted portion J1 where the sealing body member 3 is mainly friction-stirred to flow plastically by friction heat between the sealing body member 3 and both the base side pin F2 and the tip side pin F3, and the step side face 12b and the outer peripheral side face 3c of the sealing body member 3 can be joined together at the first abutted portion J1. In addition, since friction-stirring is performed with both the base side pin F2 and the tip side pin F3 being in contact only with the sealing body member 3, the first aluminum alloy of the jacket body member 2 hardly mixes into the sealing body member 3. Accordingly, since the second aluminum alloy of the sealing body member 3 is mainly friction-stirred at the first abutted portion J1, the strength of the joined portion is prevented from lowering. In addition, the step side face 12b of the jacket body member 2 is formed to incline outward toward the opening of the jacket body member 2, both the base side pin F2 and the tip side pin F3 are easily prevented from coming into contact with the jacket body member 2 without decreasing the strength of the joined portion. In addition, since the thickness of the sealing body member 3 is increased and the plastically flowing material is made to flow into the gap in the first abutted portion J1, the joint portion can be prevented from being short of metal.

Figure 13:
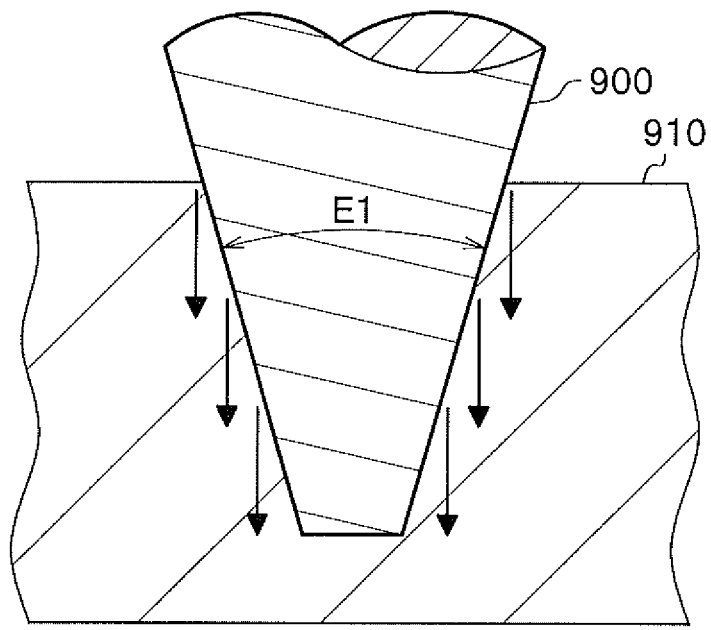
FIG. 13 schematically shows a conventional rotary tool.
Figure 14:
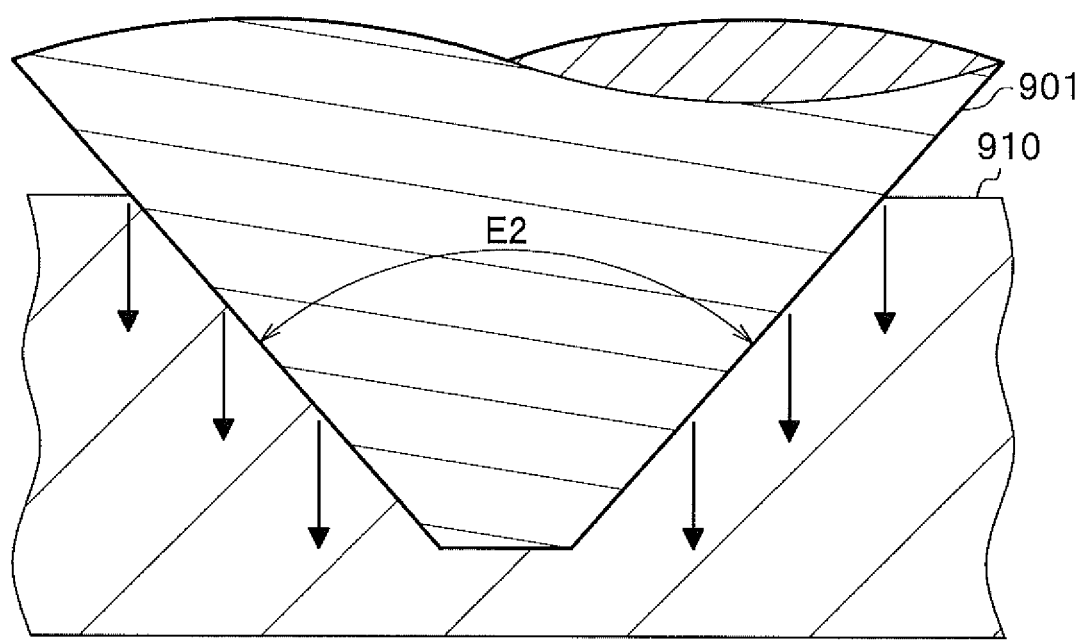
FIG. 14 schematically shows a conventional rotary tool.

If the conventional rotary tool 900 as shown in FIG. 13 is used, the metal member 910 to be joined is not held down by the shoulder portion, which results in problems with a recessed groove (formed of the front face of the metal member to be joined and a surface of the plasticized region) becoming larger and a surface roughness of the joined face becoming larger. In addition, there would be a problem that a raised portion (portion of joined metal members having a front face raised from the front face of the joined metal members before joining) could be formed on the side of the recessed groove. On the other hand, if a rotary tool 901 as shown in FIG. 14, which a taper angle E2 being larger than the taper angle E1 of the rotary tool 900, is used, the recessed groove would be made smaller and the raised portion is made smaller as well, because the front face of the metal member to be joined can be more strongly held down than the rotary tool 900. However, downward plasticized material flow would be so strong that a kissing bond is more likely to be formed under the plasticized region.

To the contrary, the primary joining rotary tool F of the present embodiment includes the base side pin F2 and the tip side pin F3 having the taper angle B smaller than the taper angle A of the base side pin F2. Due to this configuration, the primary joining rotary tool F can be easily inserted into the sealing body member 3. In addition, since the taper angle B of the tip side pin F3 is smaller, the primary joining rotary tool F can be easily inserted to a deep position in the sealing body member 3. In addition, due to the taper angle B of the rip side pin F3 being smaller, the plasticized material flowing downward is suppressed, compared with the rotary tool 901. Accordingly, a kissing bond can be prevented from being formed under the plasticized region W1. On the other hand, since the taper angle A of the base side pin F2 is larger, joining is more reliably performed with this rotary tool than with the conventional rotary tool, even if the thickness of the metal member to be joined changes or the height position of the joining changes.

In addition, since the plastically flowing material can be held down by the outer circumferential face of the base side pin F2, the recessed groove formed on the joined face can be made smaller and the raised portion that can be formed on the side of the recessed groove is not formed or made smaller if it is formed. In addition, since the pin step portion F21 is relatively shallow and has a wide exit, the plastically flowing material can easily flow out of the pin step portion F21 though the plastically flowing material is held down by the step bottom face F21a. As a result, the plastically flowing material is hardly stuck on the outer circumferential face of the base side pin F2 though the plastically flowing material is held down by the base side pin F2. Accordingly, the surface roughness of the joint portion is made smaller and the joining quality is preferably stabilized.

In addition, since the step side face 12b of the jacket body member 2 inclines outward toward the opening of the jacket body member 2 in the first primary joining process, the tip side pin F3 can be easily prevented from coming in contact with the jacket body member 2. In addition, since the inclination angle β of the step side face 12b (See FIG. 7) is equal to the inclination angle α (See FIG. 1) of the tip side pin F3 (the step side face 12b is in parallel with the outer circumferential face of the tip side pin F3) in the present embodiment, the tip side pin F3 can be positioned very close to the step side face 12b, although the tip side pin F3 is prevented from coming in contact with the step side face 12b.

In addition, although the rotation direction and the moving direction of the primary joining rotary tool F can be appropriately determined in the first primary joining process, the rotation direction and the moving direction of the primary joining rotary tool F are set in a manner that the jacket body member 2 is positioned on a shear side of the plasticized region W1 formed along a moving track along which the primary joining rotary tool F has moved while the sealing body member 3 is positioned on a flow side of the plasticized region W1. Since the jacket body portion 2 is positioned on the shear side, the stirring action by the base side pin F2 and the tip side pin F3 is enhanced in the vicinity of the first abutted portion J1, the temperature at the first abutted portion J1 presumably becomes higher, which contributes to more reliably joining the step side face 12b and the outer peripheral side face 3c of the sealing body member 3 at the first abutted portion J1.

The shear side (advancing side) refers to a side where a relative velocity of the rotary tool at its circumference relative to a portion to be joined is a summation of a tangential velocity of the rotary tool and a moving velocity of the rotary tool. On the other hand, the flow side (retreating side) refers to a side where the rotary tool is rotated to move in an opposite direction to the moving direction in which the rotary tool is moved. Thus, the relative velocity of the rotary tool at its circumference relative to a portion to be joined is lower.

In addition, by performing the second primary joining process, the strength of a joined portion of the jacket body member 2 and the sealing body member 3 that are joined is increased. In addition, since friction-stirring in the second primary joining process is performed with the base side pin F2 of the primary joining rotary tool F holding down the front face 3a of the sealing body member 3 in the same way as in the first primary joining process, the surface roughness of the joined portion can be made relatively small and the joining quality can be preferably stabilized.

In addition, since the thickness of the sealing body member 3 is set to be larger than the height of the step side face 12b, the first abutted portion J1 can be prevented from being short of metal. Furthermore, since the sealing body member 3 has a larger thickness, heat exchange efficiency with a heat generating body member can be enhanced compared with the sealing body member 3 being thinner.

In addition, since the first aluminum alloy of the jacket body member 2 has a hardness higher than that of the second aluminum alloy of the sealing body member 3, durability of the liquid-cooling jacket 1 is improved. The first aluminum alloy of the jacket body member 2 is preferably a cast aluminum alloy and the second aluminum alloy of the sealing body member 3 is preferably a wrought aluminum alloy. For example, if an Al—Si—Cu system aluminum alloy casting material such as JIS H5302 ADC 12 is used for the first aluminum alloy, the jacket body member 2 has good castability, high strength and cutting property. In addition, if JIS A1xxx aluminum or JIS A6xxx aluminum alloy is used for the second aluminum alloy, the second aluminum alloy has good workability and high thermal conductivity.

In addition, any one of the first primary joining process and the second primary joining process may be performed prior to the other primary joining process. Furthermore, a provisional joining through friction-stirring or welding may be performed on the first abutted portion J1 prior to the first primary joining process. If the provisional joining is performed, a gap is prevented from being formed in the abutted portion when each of the first primary joining process and the second primary joining process is performed.

Second Embodiment

Next, a method for manufacturing a liquid-cooling jacket of a second embodiment of the present invention is described. A preparation process, a placing process, a first primary joining process and a second primary joining process are performed for the method for manufacturing a liquid-cooling jacket of the second embodiment. The preparation process, the placing process and the second primary joining process in the second embodiment are equivalent to corresponding processes in the first embodiment. Accordingly, no explanation on these processes is repeated. The following description focusses on differences from the first embodiment.

Figure 15:
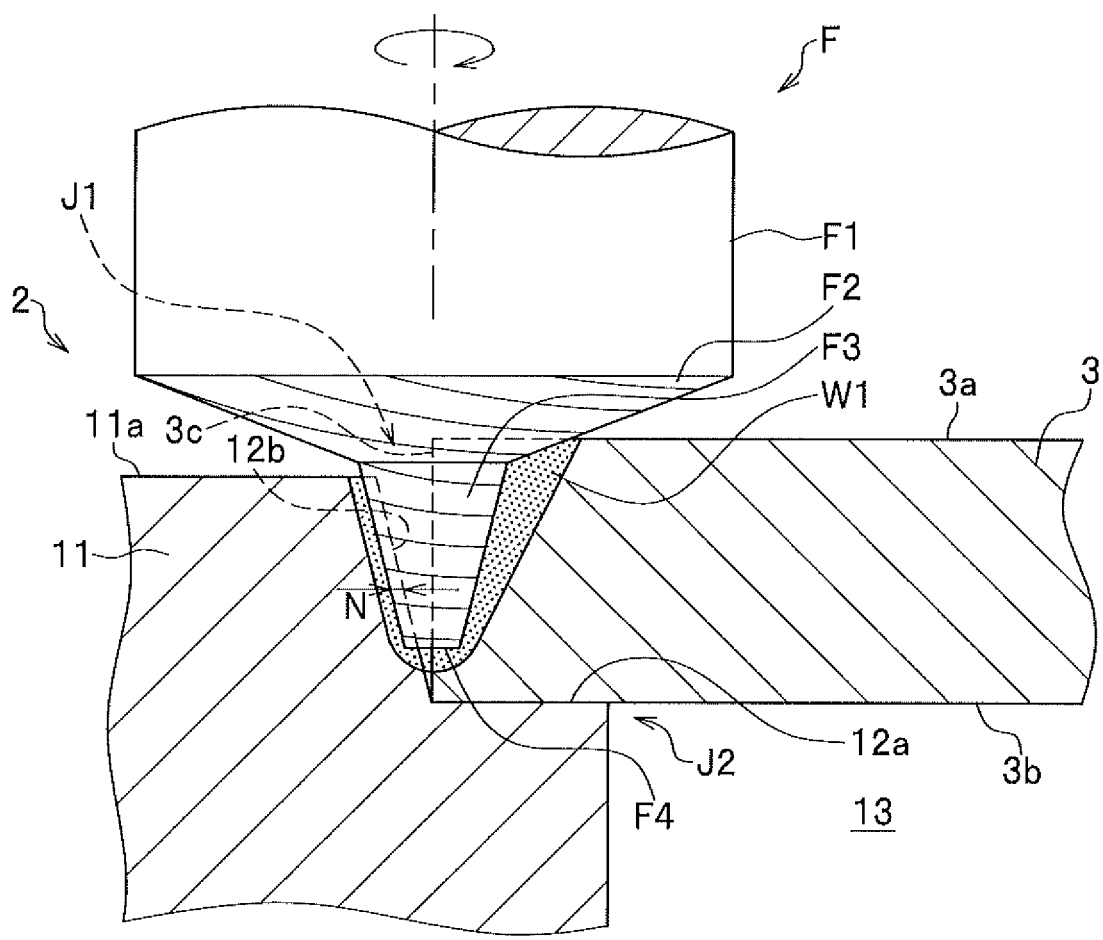
FIG. 15 is a cross-sectional view of a first primary joining process of a method for manufacturing a liquid-cooling jacket of a second embodiment of the present invention.

As shown in FIG. 15, when the primary joining rotary tool F is made to move along the first abutted portion J1 in the first primary joining process, friction-stirring is performed with a small portion of the tip side pin F3 being positioned across the step side face 12b and with the outer circumferential face of the base side pin F2 being in contact with the front face 3a of the sealing body member 3. In the first primary joining process, the base side pin F2 is not in contact with the peripheral wall end face 11a, and the tip side pin F3 is not in contact with the step bottom face 12a.

A crossed amount of the outer circumferential face of the tip side pin F3 across the step side face 12b is denoted by an offset width N. When a small portion of the outer circumferential face of the tip side pin F3 is positioned across the step side face 12b with the flat face F4 of the tip side pin F3 being positioned above the step bottom face 12a, as is the case with this embodiment, the offset amount N should be set to 0<N≤0.5 mm and is preferably set to 0<N≤0.25 mm.

Since only a small portion of the outer circumferential face of the tip side pin F3 is positioned across the step side face 12b in the primary joining process of this embodiment, an amount of the first aluminum alloy of the jacket body member 2 mixing into the sealing body member 3 can be kept small while the first abutted portion J1 can be reliably joined.

In addition, since the step side face 12b is in parallel with the outer circumferential face of the tip side pin F3, the crossed amount of the tip side pin F3 across the step side face 12b is constant in the height direction. As a result, if a small portion of the outer circumferential face of the tip side pin F3 is positioned across the step side face 12b of the peripheral wall step portion 12, the plastically flowing material is stirred relatively homogeneously over the friction-stirred region, which contributes to suppressing the strength of the joined portion lowering.

In addition, since the plastically flowing material is held down by the outer circumferential face of the base side pin F2, as is the case with the first embodiment, the recessed groove formed on the side of the surface of the joined portion can be made smaller while the raised portion that can be formed on the recessed groove is not formed or can be made smaller if it is formed. Furthermore, the surface roughness of the joined portion is made smaller as well, and the joint quality is preferably stabilized.

Third Embodiment

Next, a method for manufacturing a liquid-cooling jacket of a third embodiment of the present invention is described. A preparation process, a placing process, a first primary joining process and a second primary joining process are performed for the method for manufacturing a liquid-cooling jacket of the third embodiment. The preparation process, the placing process and the second primary joining process in the third embodiment are equivalent to corresponding processes in the first embodiment. The following description focusses on differences from the first embodiment.

Figure 16:
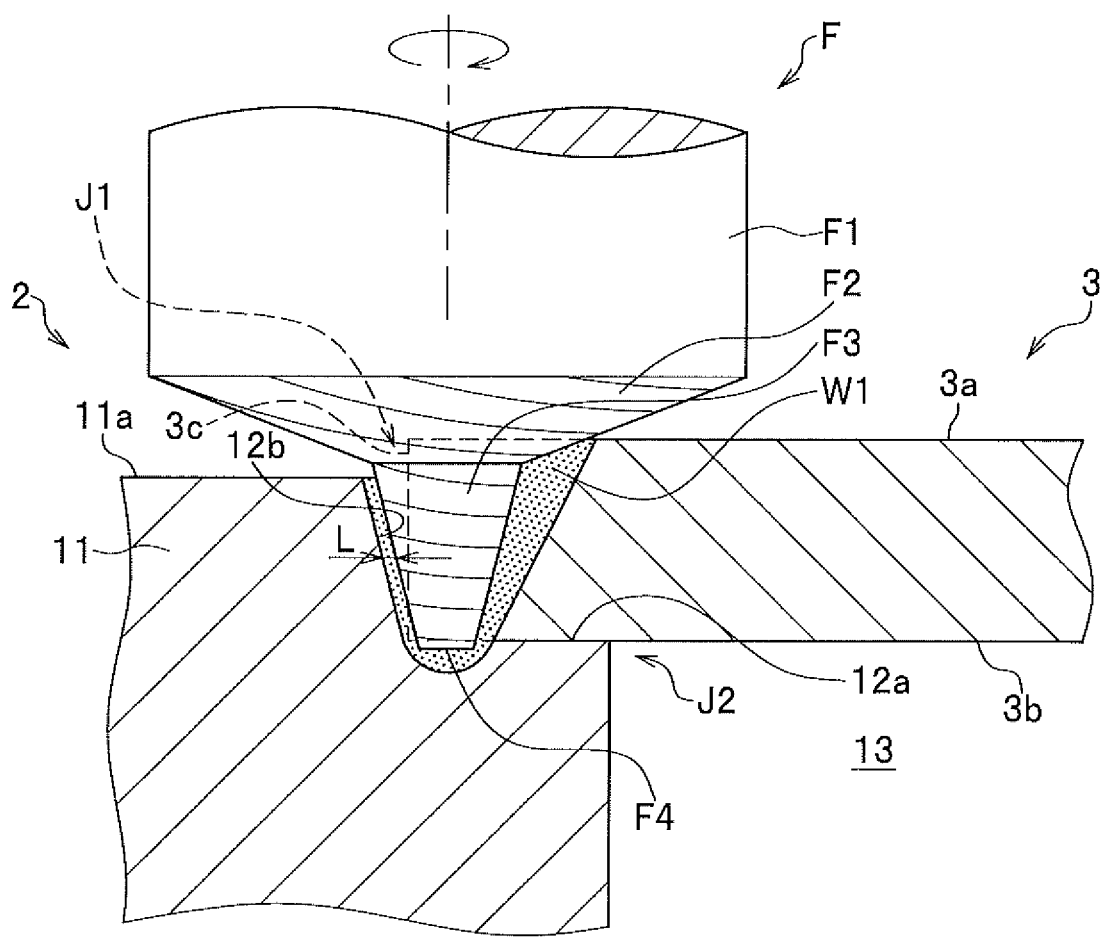
FIG. 16 is a cross-sectional view of a first primary joining process of a method for manufacturing a liquid-cooling jacket of a third embodiment of the present invention.

In the first primary joining process of the third embodiment, as shown in FIG. 16, friction-stir-welding is performed with the outer circumferential face of the tip side pin F3 being kept off the step side face 12b and with the flat face F4 of the tip side pin F3 being positioned a short length below the step bottom face 12a.

The third embodiment can provide generally the same effect as the first embodiment. In addition, since friction-stir-welding is performed with the flat face F4 of the tip side pin F3 being positioned below the step bottom face 12a, the strength of the second abutted portion J2 is increased. Furthermore, since only a small tip portion of the tip side pin F3 is positioned across the step bottom face 12a, the first aluminum alloy of the jacket body member 2 can be well prevented from mixing into the sealing body member 3.

Fourth Embodiment

Next, a method for manufacturing a liquid-cooling jacket of a fourth embodiment of the present invention is described. A preparation process, a placing process, a first primary joining process and a second primary joining process are performed for the method for manufacturing a liquid-cooling jacket of the fourth embodiment. The preparation process, the placing process and the second primary joining process in the fourth embodiment are equivalent to corresponding processes in the first embodiment. The following description focusses on differences from the first embodiment.

Figure 17:
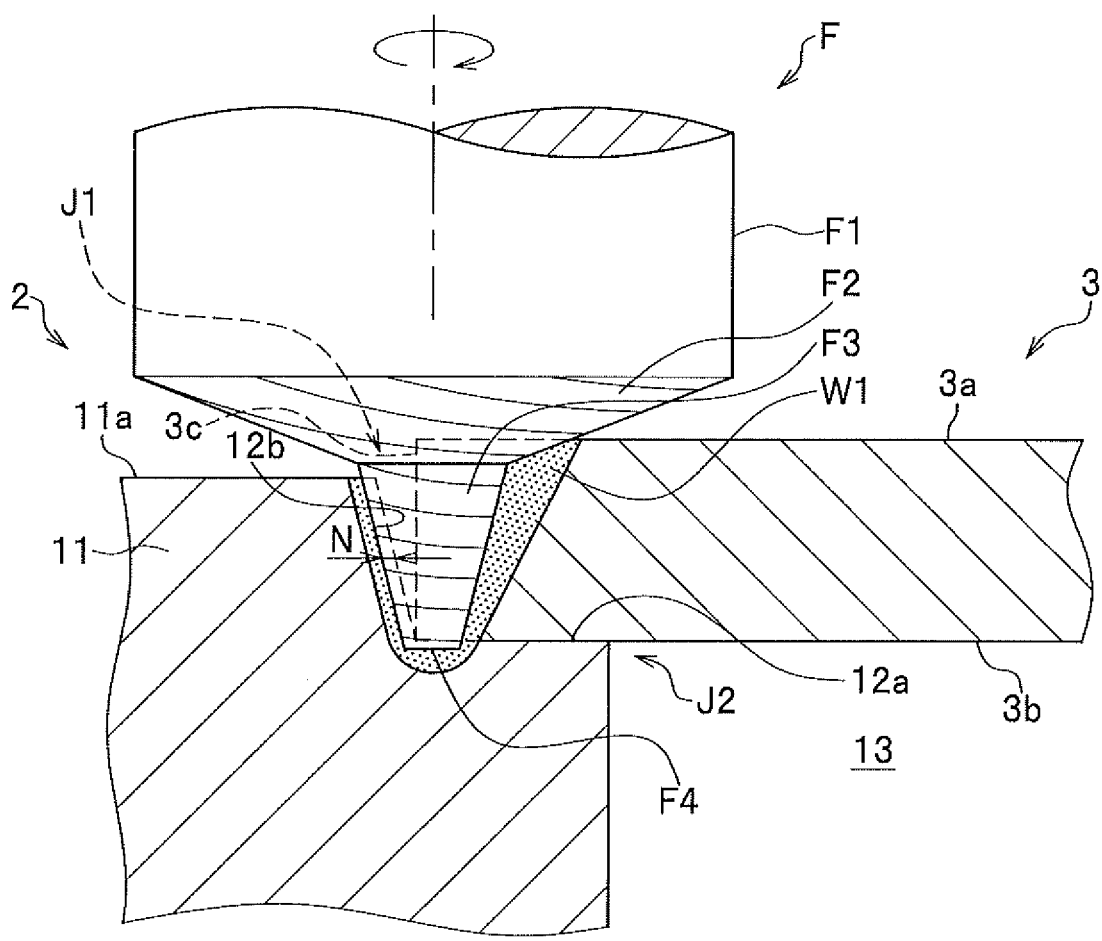
FIG. 17 is a cross-sectional view of a first primary joining process of a method for manufacturing a liquid-cooling jacket of a fourth embodiment of the present invention.

In the first primary joining process of the fourth embodiment as shown in FIG. 17, friction-stirring is performed with a small portion of the outer circumferential face of the tip side pin F3 being positioned across the step side face 12b and with the flat face F4 of the tip side pin F3 being positioned a short length below the step bottom face 12a. In the first primary joining process of this embodiment, friction-stirring is performed with the surface 3a of the sealing body member being held down by the outer circumference face of the base side pin F2. The offset width N of the tip side pin F3 across the step side face 12b is set in the same way as in the second embodiment.

The fourth embodiment can provide generally the same effect as the second embodiment. In addition, since friction-stirring is performed with the flat face F4 of the tip side pin F3 being positioned below the step bottom face 12a, the joining strength of the second abutted portion J2 is increased. Furthermore, since the flat face F4 is positioned only a short length below the step bottom face 12a, the first aluminum alloy of the jacket body member 2 can be well prevented from mixing into the sealing body member 3.

First Modification Example of the First Embodiment

Next, a method for manufacturing a liquid-cooling jacket of a first modification example of the first embodiment is described. As shown in FIG. 18, the first modification example differs from the first embodiment in that the provisional joining process, the first primary joining process and the second primary joining process are performed in the first modification example, using a cooling plate. The following description focusses on differences from the first embodiment.

In the first modification example of the first embodiment, the jacket body member 2 is clamped to a table K when a clamping process is performed. The table K includes a base plate K1 in a shape of a rectangular parallelepiped, clamps K3 respectively fitted at four corners of the base plate K1 and a cooling pipe WP that is disposed to run in the base plate K1. The table K is a member to which the jacket body member 2 is clamped and which functions as a "cooling plate" in the claims.

The cooling pipe WP is a pipe member embedded in the base plate K1. Refrigerant medium flows inside the cooling pipe WP. Though disposition of the cooling pipe WP, that is, a shape of a refrigerant passage through which the refrigerant medium flows, is not specifically limited, the planar shape of the refrigerant passage corresponds to the moving track along which the first primary joining rotary tool F is moved in the first primary joining process in this first modification example. Accordingly, the cooling pipe WP is disposed in a manner that the cooling pipe WP is seen overlapping roughly with the first abutted portion J1 in a plan view.

In the provisional joining process, the first primary joining process and the second primary joining process of the first modification example, friction-stir-welding is performed with the refrigerant medium flowing in the cooling pipe WP after the jacket body member 2 is clamped to the table K. Thus, friction heat generated by friction-stirring can be dissipated, and deformation of the liquid cooling jacket 1 caused by thermal contraction can be suppressed. In addition, since the refrigerant passage is disposed to overlap with the first abutted portion J1 (moving track along which the provisional joining tool and the primary joining tool F are moved) in the plan view, a portion where friction heat is generated is intensively cooled, which contributes to enhancing cooling efficiency. In addition, since the refrigerant medium is made to circulate through the cooling pipe WP appropriately disposed, it is easy to control the flow of the refrigerant medium. In addition, the jacket body member 2 is in face-contact with the table K (cooling plate), which results in the cooling efficiency being enhanced.

Furthermore, friction-stir-welding may be performed with the refrigerant medium being made to flow in the jacket body member 2 while the jacket body member 2 and the sealing body member 3 are being cooled with the table K (cooling plate).

Second Modification Example of the First Embodiment

Figure 19A:
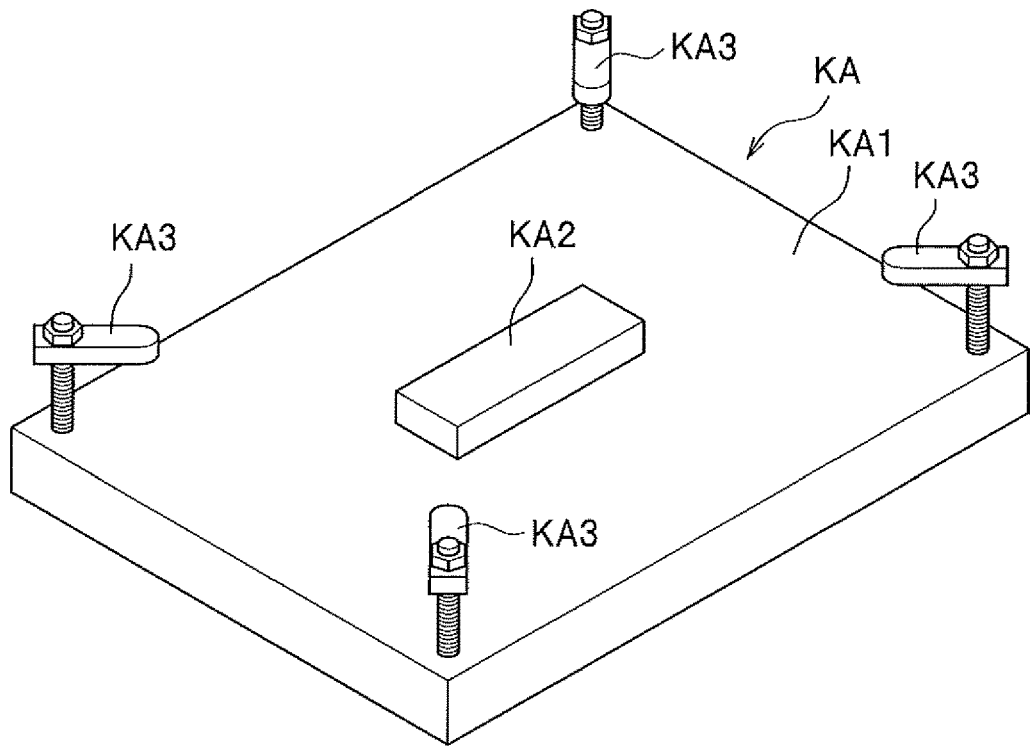
FIG. 19A shows a second modification example of a method for manufacturing a liquid-cooling jacket of the first embodiment of the present invention and is a perspective view of a table.
Figure 19B:
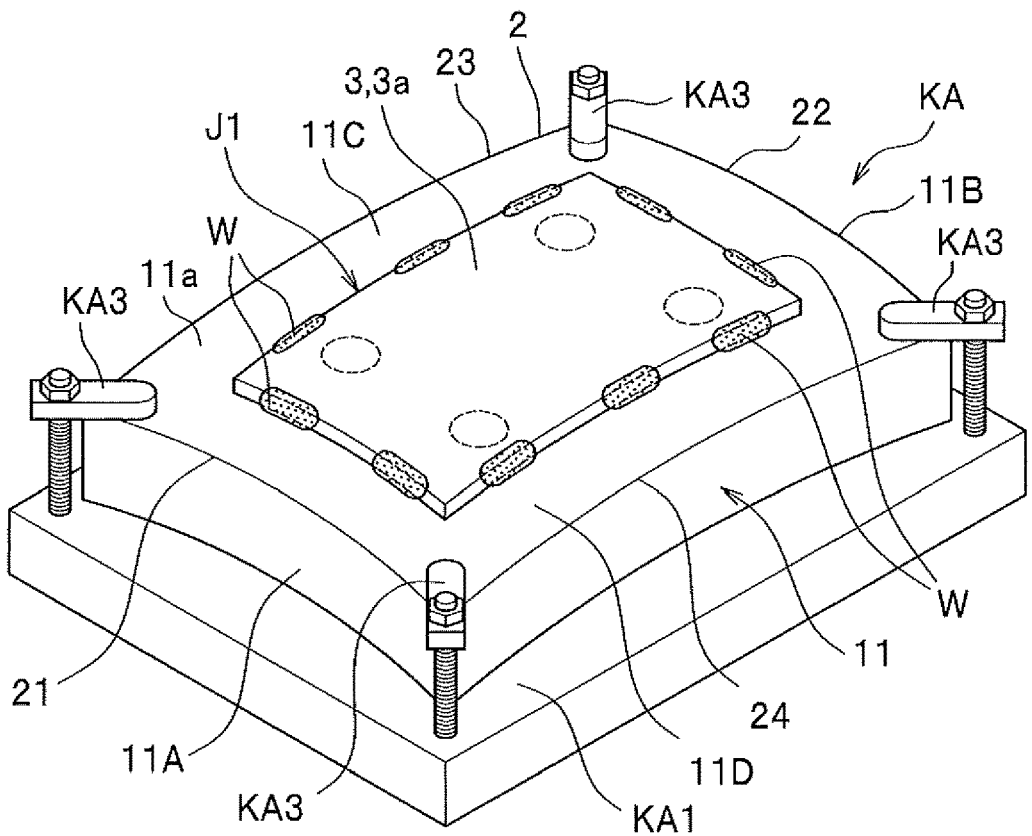
FIG. 19B shows the second modification example of the method for manufacturing a liquid-cooling process of the first embodiment of the present invention and is a perspective view of a jacket body member and a sealing body member that are clamped to the table.

Next, a method for manufacturing a liquid-cooling jacket of a second modification example of the first embodiment is described. As shown in FIG. 19A and FIG. 19B, the second modification example differs from the first embodiment in that the first primary joining process and the second primary joining process are performed in the second modification example with both a front face of the jacket body member 2 and the front face 3a of the sealing body member 3 deforming to curve in a raised shape. The following description focusses on differences from the first embodiment.

A table KA as shown in FIG. 19A is used for the second modification example. The table KA includes a base plate KA1 in a shape of a rectangular parallelepiped, a spacer KA2 disposed at a center of the base plate KA1 and clamps KA3 fitted respectively at four corner portions of the base plate KA1. The spacer KA2 may be formed integrally with the base plate KA1 or may be a separate member from the base plate KA1.

In the clamping process of the second modification example, as shown in FIG. 19B, the jacket body member 2 and the sealing body member 3, which are joined together through the provisional joining process, are clamped to the table KA with the clamps KA3. There are plasticized regions W formed through the provisional joining process.

After the jacket body member 2 and the sealing body member 3 are clamped to the table KA, the bottom portion 10 of the jacket body member 2, the peripheral wall end face 11a and the front face 3a of the sealing body member 3 deform to curve in a raised shape with their center portions raised. To be more specific, a first side portion 21 of a wall portion 11A of the jacket body member 2, a second side portion 22 of a wall portion 11B, a third wall portion 23 of a wall portion 11C and a fourth side portion 24 of a wall portion 11D deform to curve.

In the first and second primary joining processes of the second modification example, friction-stir-welding is performed with the primary joining rotary tool F. In the first primary joining process and the second primary joining process, a deformation amount of at least one of the jacket body member 2 and the sealing body member 3 is measured in advance, and friction-stir-welding is performed while insertion depths are adjusted according to the deformation amount that is measured. Accordingly, the primary joining rotary tool F is moved along a curved surface of the peripheral wall end face 11a and the front face 3a of the sealing body member 3 in a manner that the moving track along which the primary joining rotary tool F moves becomes a curved line. As a result, a depth and a width of the plasticized region are kept constant.

There is a risk that a side of the liquid cooling jacket 1 where the sealing body member 3 of the liquid cooling jacket 1 deforms to be in a recessed shape due to thermal contraction of the plasticized region caused by input heat generated by friction-stirring. However, according to the first primary joining process and the second primary joining process of the second modification example, since the jacket body member 2 and the sealing body member 3 are clamped in a raised shape with their center portions raised so that there remains a tensile stress on each of the peripheral wall end face 11a and the front face 3a, the liquid cooling jacket 1 can be made flat after the friction-stir-welding by the thermal contraction.

In addition, if the primary joining process is performed with a conventional rotary tool, a shoulder portion of the rotary tool comes in contact with the jacket body member 2 and the sealing body member 3 that curve in a raised shape with their center portions raised, which make the operation of the rotary tool difficult. However, the primary joining rotary tool F of the second modification example does not have a shoulder portion, and hence, there is no problem with the operation of the rotary tool F even if the jacket body member 2 and the sealing body member 3 curve in the raised shape To measure deformations of the jacket body member 2 and the sealing body member 3, a height measurement device that has been known may be used. Using a friction-stirring apparatus provided with a measurement device to measure at least one of a height of the jacket body member 2 from the table KA and a height of the sealing body member 3 from the table KA, the first and second primary joining processes may be performed while measuring the deformation amount of the jacket body member 2 or the deformation amount of the sealing body member 3.

The jacket body member 2 and the sealing body member 3 are curved so that all of the first side portion 21 to the fourth side portion 24 are in a curved line shape in the second modification example as described above. However, the second modification example is not limited to this. For example, the jacket body member 2 and the sealing body member 3 may be curved so that the third side portion 23 and the fourth side portion 24 are in curved shapes while the first side portion 21 and the second side portion 22 are straight or so that the first side portion 21 and the second side portion 22 are in curved shapes while the third side portion 23 and the fourth side portion 24 are straight.

In addition, in the second modification example, the height positions of the base side pin F2 and the tip side pin F3 are changed according to deformation amounts of the jacket body member 2 and the sealing body member 3, the first and second primary joining processes may be performed while the heights of the base side pin F2 and the tip side pin F3 from the table KA are kept constant.

In addition, the spacer KA2 may have any shape as long as the front face sides of the jacket body member 2 and the sealing body member 3 can be clamped in a raised shape with their center portions raised. The spacer KA2 may be skipped if the jacket body member 2 and the sealing body member 3 can be clamped to have their front face sides raised. Furthermore, the primary joining rotary tool F may be fitted to a robot arm equipped with a rotation drive means such as a spindle unit thereon. The rotation axis of the primary joining rotary tool F can be easily oriented in various directions with this configuration.

Third Modification Example of the First Embodiment

Figure 20:
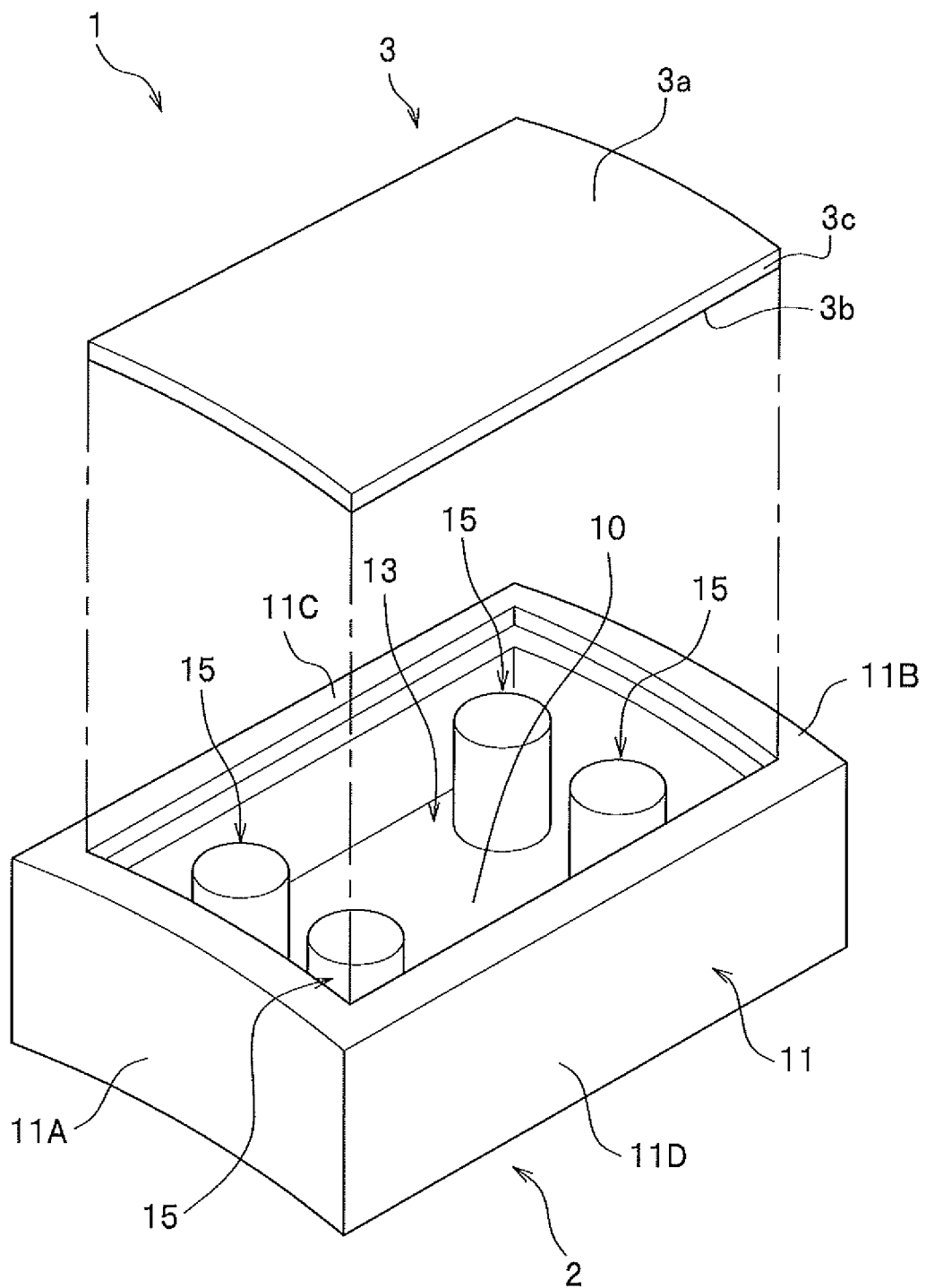
FIG. 20 is a perspective exploded view of a third example of a method for manufacturing a liquid-cooling jacket of the first embodiment of the present invention.
Figure 22:
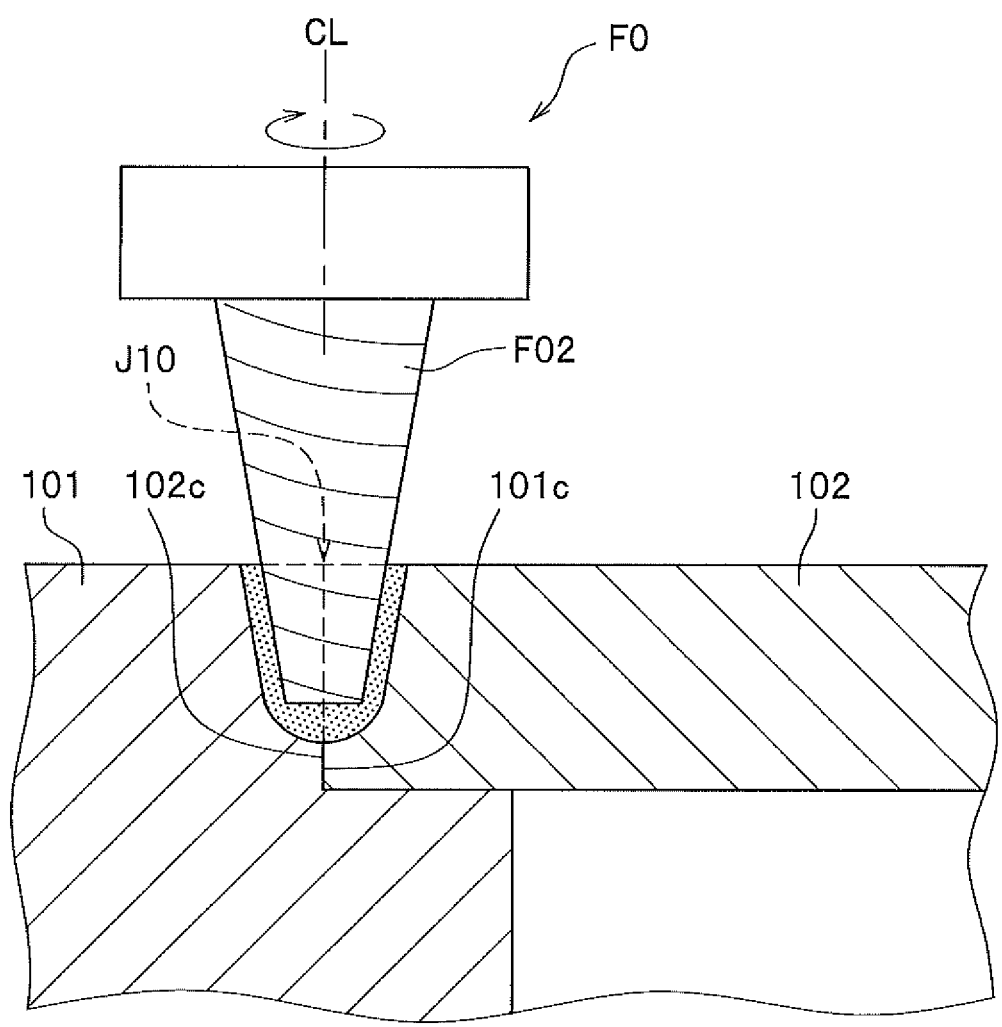
FIG. 22 is a cross-sectional view of a conventional method for manufacturing a liquid-cooling-jacket.

Next, a method for manufacturing a liquid-cooling jacket of a third modification example of the first embodiment is described. As shown in FIG. 20, the third modification example differs from the first embodiment in that the jacket body member 2 and the sealing body member 3 are formed in a raised shape with their front face sides being raised in advance in the preparation process. The following description focusses on differences from the first embodiment.

In the preparation process of the third modification example of the first embodiment, the jacket body member 2 and the sealing body member 3 are formed through diecasting in a manner that their front face sides are in a raised shape. As a result, the jacket body member 2 has the bottom portion 10 and the peripheral wall portion 11 in a raised shape with their front face sides being raised. The sealing body member 3 is curved with the front face 3a in the raised shape.

As shown in FIG. 21, the jacket body member 2 and the sealing body member 3 that are joined through the provisional joining are clamped when the clamping process is performed. A table KB includes a base plate KB1 in a shape of a rectangular parallelepiped, a spacer KB2 disposed at a center of the base plate KB1, clamps KB3 respectively fitted at four corner portions and a cooling pipe WP disposed to run in the base plate KB1. The table KB is a member to which the jacket body member 2 is clamped and which functions as a "cooling plate" in the claims.

The spacer KB2 is formed of a curved face KB2a in a raised shape curved upward and vertical faces KB2b, KB2b formed respectively along both ends of the curved face KB2a and extending vertically upward from the base plate KB1. The spacer KB2 has a first side portion Ka and a second side portion Kb that are in curved shapes and a third side portion Kc and a fourth side portion Kd that are in a straight shape.

The cooling pipe WP is a pipe member embedded in the base plate KB1. Refrigerant medium flows inside the cooling pipe WP. Though disposition of the cooling pipe WP, that is, a shape of a refrigerant passage through which the refrigerant medium flows, is not specifically limited, the planar shape of the refrigerant passage corresponds to the moving track along which the primary joining rotary tool F is moved in the first primary joining process in this third modification example. Accordingly, the cooling pipe WP is disposed in a manner that the cooling pipe WP is seen overlapping roughly with the first abutted portion J1 in a plan view.

In the clamping process of the third modification example, the jacket body member 2 and the sealing body member 3, which are joined together through the provisional joining process, are clamped to the table KB with the clamps KB3. To be more specific, the jacket body member 2 and the sealing body member 3 that are joined together are clamped to the table KB in a manner that a back face of the bottom portion 10 of the jacket body member 2 is in face-contact with the curved face KB2a. After the jacket body member 2 is clamped to the table KB, the jacket body member 2 curves in a manner that the jacket body member has the first side portion 21 of a wall portion 11A and the second side portion 22 of a wall portion 11B that are curved lines while the jacket body member has the third side portion 23 of a wall portion 11C and the fourth side portion 24 of a wall portion 11D that are straight lines.

In the first and second primary joining processes of the third modification example, friction-stir-welding is performed with the primary joining rotary tool F. A deformation amount of at least one of the jacket body member 2 and the sealing body member 3 is measured in advance, and friction-stir-welding is performed in the first primary joining process and the second primary joining process while insertion depths of the base side pin F2 and the tip side pin F3 are adjusted according to the deformation amount that is measured. Accordingly, the primary joining rotary tool F is made to move along a curved surface of the peripheral wall end faces 11a and the front face 3a of the sealing body member 3 in a manner that the moving track along which the primary joining rotary tool F moves becomes a curved line or a straight line. As a result, a depth and a width of the plasticized region are kept constant.

There is a risk that a side of the liquid cooling jacket 1 where the sealing body member 3 of the liquid cooling jacket 1 deforms to be in a recessed shape due to contraction of the plasticized region caused by input heat generated by friction-stirring. However, according to the first primary joining process and the second primary joining process of the third modification example, since the jacket body member 2 and the sealing body member 3 are formed in a raised shape in advance so that the liquid cooling jacket 1 can be made flat after the friction-stir-welding by the thermal contraction.

In the third modification example, the back face of the bottom portion 10 of the jacket body member 2, which is in a recessed shape, is made to be in face-contact with the curved face KB2a of the spacer KB2. Thus, friction-stir-welding is performed while the jacket body member 2 and the sealing body member 3 are more efficiently cooled. Since friction heat generated by friction-stirring is dissipated, deformation of the liquid cooling jacket 1 caused by thermal contraction can be suppressed. As a result, the curvatures of the jacket body member 2 and the sealing body member 3, which are formed in raised shapes, can be made smaller in the preparation process.

Deformation amounts of the jacket body member 2 and the sealing body member 3 can be measured with a height measurement device that has been known. For example, the primary joining process may be performed while measuring a deformation amount of the jacket body member 2 or the sealing body member 3 by using a friction-stirring apparatus provided with a measurement device to measure at least one of a height of the jacket body member 2 from the table KB and a height of the sealing body member 3 from the table KB.

In the third modification example, the jacket body member 2 and the sealing body member 3 are curved in a manner that the first side portion 21 and the second side portion 22 are in curved shapes. However other configurations are possible. For example, the spacer KB2 may have a spherical face, and the back face of the bottom portion 10 of the jacket body member 2 may be made to be in face-contact with the spherical face. In this case, all of the first side portion 21 to the fourth side portion 24 are in curved shapes with the jacket body member 2 being clamped to the table KB.

In the third modification example, the height of the base side pin F2 and the tip side pin F3 is altered in accordance with the deformation amounts of the jacket body member 2 and the sealing body member 3. However, the primary joining process may be performed with the heights of the base side pin F2 and the tip side pin F3 from the table KB being kept constant.

DESCRIPTION OF SIGNS

1 Liquid cooling jacket
2 Jacket body member
3 Sealing body member
3a Front face
3b Back face
3c Outer peripheral side face
10 Bottom face
11 Peripheral wall portion
11a Peripheral wall end face
12 Peripheral wall step portion
12a Step bottom face
12b Step side face
13 Recessed portion
15 Support pillar
15a End face
F Primary joining rotary tool (Rotary tool)
F1 Base shaft portion
F2 Base side pin
F3 Tip side pin
F4 Flat face
J1 First abutted portion
J2 Second abutted portion
J3 Third abutted portion
K Table (Refrigerant plate)
W1 Plasticized region
W2 Plasticized region
WP Cooling pipe

What is claimed is:

1. A method for manufacturing a liquid cooling jacket joining a jacket body member and a sealing body member through friction-stirring,
   wherein the jacket body member includes a bottom portion and a peripheral wall portion extending vertically upward from a peripheral edge portion of the bottom portion and is made of a first aluminum alloy,
   the sealing body member seals an opening of the jacket body member and is made of a second aluminum alloy,
   the first aluminum alloy has a higher hardness than a hardness of the second aluminum alloy,
   a rotary tool is a rotary tool for primary joining for the friction stirring and includes a base side pin and a tip side pin,
   the base side pin has a taper angle larger than that of the tip side pin,
   the rotary tool includes a pin step portion formed in a staircase shape on an outer circumferential face of the base side pin,
   a spiral groove is engraved on an outer circumferential face of the tip side pin, the spiral groove being formed of a spiral bottom face and a spiral side face, and a spiral angle made between the spiral bottom face and the spiral side face is between 45° and 90°, and
   the spiral bottom face of the spiral groove adjoins the spiral side face of the spiral groove at a radially outer side of the tip side pin, and the spiral side face of the spiral groove adjoins the spiral bottom face of the spiral groove at a radially inner side of the tip side pin,
   the method comprising;
   a preparation process of forming along an inner peripheral edge of the peripheral wall portion a peripheral wall step portion including a step bottom face and a step side face, wherein the step side face extends upward toward the opening of the jacket body member from the step bottom face and inclines outward, and forming a plate thickness of the sealing body member to be larger than a height of the step side face of the peripheral wall step portion;
   a placing process of placing the sealing body member on the jacket body member to form a first abutted portion and a second abutted portion, the first abutted portion where the step side face of the peripheral wall step portion and an outer peripheral side face of the sealing body member abut each other with a gap formed between the step side face of the peripheral wall step portion and the outer peripheral side face of the sealing body member, and the second abutted portion where a back face of the sealing body member is placed on the step bottom face of the peripheral wall step portion; and a first primary joining process of friction-stirring being performed by inserting the tip side pin and the base side pin of the rotary tool that is rotating into the sealing body member and moving the rotary tool along the first abutted portion with the outer circumferential face of the base side pin being in contact with a front face of the sealing body member and with an outer circumferential face of the tip side pin being in contact with the step side face of the peripheral wall step portion by an offset amount N1 to be set in a range of 0<N1≤ 0.5 mm, where the offset amount N1 is a crossed amount of the outer circumferential face of the tip side pin across the step side face, while having the second aluminum alloy of the sealing body member flow into the gap;

wherein the pin step portion is in a spiral shape in its plane view and in a staircase shape in its side view, the pin step portion is formed of a step bottom face and a step side face, the step bottom face is formed from a rotation axis of the rotary tool toward its outer circumference, and a step angle made between the step bottom face and the step side face is between 85° and less than 90°, and the step bottom face of the pin step portion adjoins the step side face of the pin step portion at a radially outer side of the base side pin, and the step side face of the pin step portion adjoins the step bottom face of the pin step portion at a radially inner side of the base side pin.

2. The method for manufacturing a liquid cooling jacket as claimed in claim 1, wherein in the first primary joining process, the friction-stirring is performed by moving the rotary tool along the first abutted portion with the tip side pin being in contact with the step bottom face of the peripheral wall step portion by an offset amount N2 to be set in a range of 0<N2≤ 0.5 mm, where the offset amount N2 is a crossed amount of the outer circumferential face of the tip side pin across the step bottom face.

3. The method for manufacturing a liquid cooling as claimed in claim 1, wherein in the first primary joining process, the friction-stirring is performed by moving the rotary tool one round along the first abutted portion.

4. The method for manufacturing a liquid cooling jacket as claimed in claim 1, wherein in the preparation process, the jacket body member is formed through die-casting, the bottom portion of the jacket body member is formed in a raised shape with a front face of the bottom portion being raised and the sealing body member is formed in a raised shape with a front face of the sealing body member being raised.

5. The method for manufacturing a liquid cooling jacket as claimed in claim 1, further comprising a provisional joining process to provisionally join the first abutted portion prior to the first primary joining process.

6. The method for manufacturing a liquid cooling jacket as claimed in claim 1, wherein in the first primary joining process, a cooling plate in which a refrigerant medium flows is fixed on a back face of the bottom portion and the friction-stirring is performed while the jacket body member and the sealing body member are being cooled by the cooling plate.

7. The method for manufacturing a liquid cooling jacket as claimed in claim 1, wherein in the first primary joining process, the friction-stirring is performed while the jacket main body member and the sealing body member are being cooled by a refrigerant medium being made to flow in a hollow formed by the jacket body member and the sealing body member.

8. The method for manufacturing a liquid cooling jacket as claimed in claim 1, wherein the spiral angle made between the spiral bottom face and the spiral side face of the spiral groove engraved on the outer circumferential face of the tip side pin is between 45° and less than 90°.

9. A method for manufacturing a liquid cooling jacket joining a jacket body member and a sealing body member through friction-stirring, wherein the jacket body member includes a bottom portion and a peripheral wall portion extending vertically upward from a peripheral edge portion of the bottom portion and is made of a first aluminum alloy, the sealing body member seals an opening of the jacket body member and is made of a second aluminum alloy, wherein the first aluminum alloy has a higher hardness than a hardness of the second aluminum alloy, a rotary tool is a rotary tool for primary joining for the friction stirring and includes a base side pin and a tip side pin, wherein the base side pin has a taper angle larger than that of the tip side pin and the rotary tool includes a pin step portion formed in a staircase shape on an outer circumferential face of the base side pin, a spiral groove is engraved on an outer circumferential face of the tip side pin, the spiral groove being formed of a spiral bottom face and a spiral side face, and a spiral angle made between the spiral bottom face and the spiral side face is between 45° and less than 90°, and the spiral bottom face of the spiral groove adjoins the spiral side face of the spiral groove at a radially outer side of the tip side pin, and the spiral side face of the spiral groove adjoins the spiral bottom face of the spiral groove at a radially inner side of the tip side pin, the method comprising:

a preparation process of forming along an inner peripheral edge of the peripheral wall portion a peripheral wall step portion including a step bottom face and a step side face, wherein the step side face extends upward toward the opening of the jacket body member from the step bottom face and inclines outward, and forming a plate thickness of the sealing body member to be larger than a height of the step side face of the peripheral wall step portion;

a placing process of placing the sealing body member on the jacket body member to form a first abutted portion and a second abutted portion, the first abutted portion where the step side face of the peripheral wall step portion and an outer peripheral side face of the sealing body member abut each other with a gap formed between the step side face of the peripheral wall step portion and the outer peripheral side face of the sealing body member, and the second abutted portion where a back face of the sealing body member is placed on the step bottom face of the peripheral wall step portion; and a first primary joining process of friction-stirring being performed by inserting the tip side pin and the base side pin of the rotary tool that is rotating into the sealing body member and moving the rotary tool along the first abutted portion with the outer circumferential face of the base side pin being in contact with a front face of the sealing body member and with an outer circumferential face of the tip side pin being in contact with the step side face of the peripheral wall step portion by an offset amount N1 to be set in a range of 0<N1≤ 0.5 mm, where the offset amount N1 is a crossed amount of the outer circumferential face of the tip side pin across the step side face, while having the second aluminum alloy of the sealing body member flow into the gap, wherein the pin step portion is in a spiral shape in its plane view and in a staircase shape in its side view, the pin step portion is formed of a step bottom face and a step side face, the step bottom face is formed from a rotation axis of the rotary tool toward its outer circumference, and a step angle made between the step bottom face and the step side face is between 85° and less than 90°, and the step bottom face of the pin step portion adjoins the step side face of the pin step portion at a radially outer side of the base side pin, and the step side face of the pin step portion adjoins the step bottom face of the pin step portion at a radially inner side of the base side pin.

10. The method for manufacturing a liquid cooling jacket as claimed in claim 9, wherein in the first primary joining process the friction-stirring is performed by moving the rotary tool along the first abutted portion with the tip side pin being in contact with the step bottom face of the peripheral wall step portion by an offset amount N2 to be set in a range of 0<N2≤0.5 mm, where the offset amount N2 is a crossed amount of the outer circumferential face of the tip side pin across the step bottom face.

11. The method for manufacturing a liquid cooling jacket as claimed in claim 9, wherein in the first primary joining process the friction-stirring is performed by moving the rotary tool one round along the first abutted portion.

12. The method for manufacturing a liquid cooling jacket as claimed in claim 9, wherein in the preparation process the jacket body member is formed through die-casting, the bottom portion of the jacket body member is formed in a raised shape with a front face of the bottom portion being raised and the sealing body member is formed in a raised shape with a front face of the sealing body member being raised.

13. The method for manufacturing a liquid cooling jacket as claimed in claim 9, further comprising a provisional joining process to provisionally join the first abutted portion prior to the first primary joining process.

14. The method for manufacturing a liquid cooling jacket as claimed in claim 9, wherein in the first primary joining process a cooling plate in which a refrigerant medium flows is fixed on a back face of the bottom portion and the friction-stirring is performed while the jacket body member and the sealing body member are being cooled by the cooling plate.

15. The method for manufacturing a liquid cooling jacket as claimed in claim 9, wherein in the first primary joining process the friction-stirring is performed while the jacket main body member and the sealing body member are being cooled by a refrigerant medium being made to flow in a hollow formed by the jacket body member and the sealing body member.

* * * * *